United States Patent [19]

Nakamura et al.

[11] Patent Number: 5,671,128
[45] Date of Patent: Sep. 23, 1997

[54] POWER SUPPLY APPARATUS

[75] Inventors: Toshiaki Nakamura; Haruo Nagase; Hiroichi Shinbori, all of Kadoma, Japan

[73] Assignee: Matsushita Electric Works, Ltd., Osaka, Japan

[21] Appl. No.: 600,219

[22] Filed: Feb. 12, 1996

[30] Foreign Application Priority Data

Feb. 23, 1995 [JP] Japan .................................. 7-035736
Feb. 23, 1995 [JP] Japan .................................. 7-035740
Sep. 29, 1995 [JP] Japan .................................. 7-254209

[51] Int. Cl.$^6$ .................................................. H05B 41/24
[52] U.S. Cl. .................................................... 363/16
[58] Field of Search ........................ 363/20–21, 56–58, 363/44, 80–85, 131–134, 16

[56] References Cited

U.S. PATENT DOCUMENTS 4,809,148  2/1989  Barn ............................................ 363/20
5,282,123  1/1994  Boylan et al. ................................ 363/21

FOREIGN PATENT DOCUMENTS 58-53195  3/1983  Japan .

*Primary Examiner*—Aditya Krishnan
*Attorney, Agent, or Firm*—Burns, Doane, Swecker & Mathis, L.L.P.

[57] ABSTRACT

A power supply apparatus in which a series circuit of first and second switching elements not blocking their reverse-directional currents is connected in parallel to a series circuit of a D.C. power source and a capacitor, a primary winding of a transformer is connected between a junction point of the D.C. power source and capacitor and a junction point of the switching elements, a secondary winding of the transformer is connected to a load circuit, and a controller is provided for controlling ON and OFF operation of the switching elements to cause a switching frequency of the switching elements to be set higher than a resonance frequency of the capacitor and an inductance of the transformer and to cause a voltage across the capacitor to increase.

32 Claims, 31 Drawing Sheets (A)

(B)

(C)

POWER SUPPLY APPARATUS

BACKGROUND OF THE INVENTION

The present invention relates to power supply apparatuses and more particularly, to a power supply apparatus which controls power to be supplied to a load through a high frequency inverter.

In a conventional exemplary power supply apparatus of the type referred to, power of a D.C. power source is supplied to a high pressure discharge lamp such as a high pressure sodium lamp, a metal halide lamp or a mercury lamp as a load through a high frequency inverter means, an AC/DC conversion means and a rectangular-wave inverter means. In this case, a rectangular wave (of several hundred Hz) is applied to the load for stable lighting of the lamp load. When the power supply apparatus is operated on such a low D.C. power source (12 V or 24 V) as a battery, a voltage across the load is about 100 V in a stationary ON mode. However, since the voltage of the D.C. power source is as low as several ten V, this requires the turn ratio of a transformer in the high frequency inverter means also including a rectification circuit to be made large, which result in that a current flowing through the primary winding of the transformer is increased with increased loss of circuit elements and a reduced circuit efficiency. Further, this also involves increase in the size of the transformer with the result that it disadvantageously becomes hard to handle the entire power supply apparatus. When such a high frequency inverter means 2 as shown, e.g., in FIG. 50 is of a half bridge type, the means can have a simple structure of only 2 transistors but a voltage across the primary winding of the transformer becomes nearly ½ the power source voltage, which disadvantageously requires increase of the turn ratio of the transformer with a large boosting ratio.

Also disclosed in Japanese Patent Application Laid-Open Publication No. 58-53195 shown in FIG. 51 is a power supply apparatus which comprises a high frequency inverter means having a voltage resonance type push-pull circuit. With this power supply apparatus, a voltage across the primary winding of a transformer becomes at least higher than a power source voltage and thus an increase in its turn ratio can be suppressed when compared with that of the above prior art. This prior art, however, has a problem that, when an input voltage is as low as several ten volts as in a battery, use of such a load as a high pressure discharge lamp causes increase of the boosting ratio with an increased primary current; whereas, when a high frequency inverter includes a resonance circuit provided on the primary winding of the transformer, this undesirably involves increase of the conduction loss and the necessity of its resonance inductor and capacitor to be of a large capacity. Further, frequency control, which fluctuates noise frequency of the output side, requires use of a large size of noise removing filter, which also results in the fact that a resultant power supply apparatus becomes large in size, thus making difficult to make the entire power supply apparatus compact and to realize a high efficiency.

For the purpose of overcoming the above problems in the above Japanese Patent Application, there has been suggested an arrangement in which a boosting circuit 8 is provided in a previous stage of a high frequency inverter means to boost and stabilize a voltage across a D.C. power source, as shown in FIG. 52. In this case, a load is connected to the high frequency inverter means through an AC/DC conversion means and a rectangular-wave inverter means. The boosting circuit 6 includes a boosting chopper circuit made up of an inductor, transistors, diodes and a smoothing capacitor, and acts to boost input D.C. voltage and output a stabilized voltage. However, this prior art is disadvantageous in that the provision of the boosting circuit in the previous stage of the high frequency inverter generally requires a high manufacturing cost with a poor economy.

Other prior art power supply apparatuses of a D.C. voltage output type are disclosed, for example, in U.S. Pat. Nos. 4,809,148 and 5,282,123 shown in FIGS. 53 and 54. In the former case, the exciting energy of the transformer is reset by charging a capacitor therewith through transistors and the energy is returned to a power source side to increase a core utilization efficiency of a transformer. However, this arrangement also involves a similar problem to the above with regard to the transformer that only an input voltage can be applied to the primary winding of the transformer in a switching mode where an output is extracted from the secondary winding of the transformer.

In the latter case, on the other hand, since a full-wave rectification circuit is provided to the secondary winding of a transformer, the output voltage of the transformer is adversely influenced by not only an input voltage but also by a voltage across a capacitor. With this arrangement, exciting energy is sent not only to the capacitor but also to the load side, so that, when the output current exceeds a predetermined value, substantially no exciting energy is charged into the capacitor, whereby a voltage across the capacitor is not so high, producing a similar problem in the above.

Accordingly, when a load having such a negative resistance as a discharge lamp is employed, it is difficult to suppress fluctuations in the load current for its stabilization. In particular, when the load becomes nearly short-circuited, an excess current flows through the load and the stress of the constituent elements is increased, which results in that, when an element having a large breakdown current is used to meet the large current requirement, the cost becomes high and the size also becomes large.

SUMMARY OF THE INVENTION

In view of the above respects, it is an object of the present invention to provide a small-sized power supply apparatus in which a power source voltage lower than an output voltage is boosted with use of a transformer, a burden imposed on the transformer can be lightened by boosting means other than change of a turn ratio of the transformer to thereby realize a simple arrangement, and the transformer is made small by reducing the turn ratio of the transformer.

An additional object of the present invention is to provide a power supply apparatus which can facilitate realization of a stable load current even when such a load as a discharge lamp having a negative resistance is employed.

In accordance with an aspect of the present embodiment, the above object is attained by providing a power supply apparatus in which a series circuit of first and second switching elements not blocking their reverse-directional currents and to be alternately turned ON and OFF is provided, a series circuit of a D.C. power source and a load circuit including an inductance element connected between both ends of the first switching element of the series circuit, a boosting capacitor is connected between both ends of the second switching element of the series circuit of the first and second switching elements through at least the load circuit, energy is stored into the load circuit from the D.C. power source through the first switching element, the energy is stored into the boosting capacitor through the second switching element, and the energy in the boosting capacitor is supplied to the load circuit through the second switching element, characterized by control means for controlling the switching elements to cause a switching frequency of the switching elements to be set higher than a resonance frequency of the boosting capacitor and inductance element and to cause a voltage across the series circuit of the first and second switching elements corresponding to a voltage across the boosting capacitor to be higher than a voltage of the D.C. power source.

Other objects and advantages of the present invention will become clear as the following description of the invention advances as detailed with reference to preferred embodiments shown in the accompanying drawings.

While the present invention will now be described with reference to the embodiments shown, it will be appreciated that the intention is not to limit the invention only to these embodiments but rather to cover all alternations, modifications and equivalent arrangements possible within the scope of appended claims.

DESCRIPTION OF THE PREFERRED EMBODIMENTS

Figure 1:
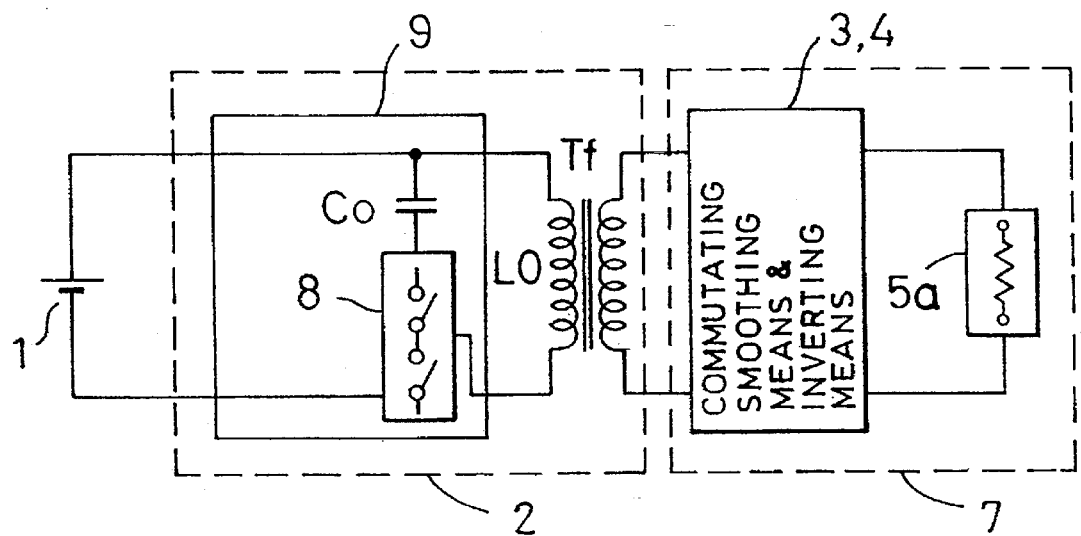
FIG. 1 is a circuit diagram for explaining a basic arrangement of a power supply apparatus in accordance with the present invention.

Referring first to FIG. 1, there is shown a circuit diagram of a basic arrangement of a power supply apparatus in accordance with the present invention, which includes a high-frequency inverter means 2, a load circuit 7 containing a load 5a, a switching element device 8, a boosting capacitor Co, and a high-frequency boosting circuit 9. In this case, the switching frequency of the switching element device 8 is set to be higher then a resonance frequency determined by the boosting capacitor Co and an inductor Lo viewed from the primary winding side of a transformer Tf, while a group of switching elements in the switching element device 8 are arranged so that the elements operate in such directions as to boost a voltage across the boosting capacitor Co. Since the switching frequency is set to be higher than the resonance frequency of the boosting capacitor Co and inductor L0, ripples in the voltage of the boosting capacitor Co can be lowered and thus the boosting capacitor Co can be used as a constant voltage source.

Figure 2:
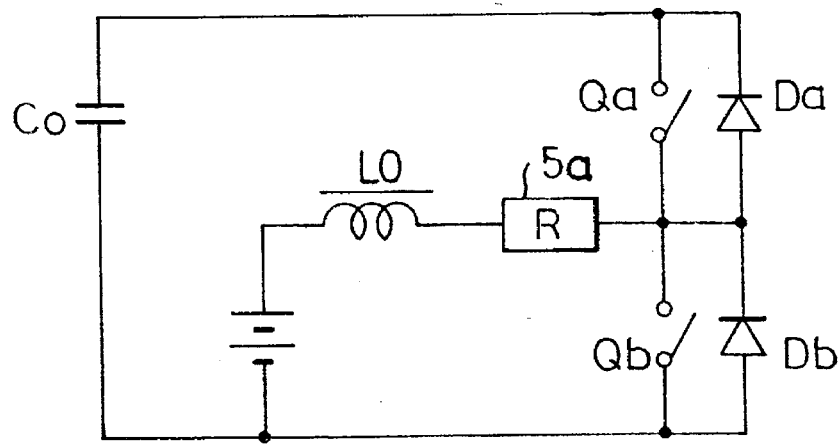
FIG. 2 is a circuit diagram of a form of the present invention employing the basic arrangement of FIG. 1.
Figure 3:
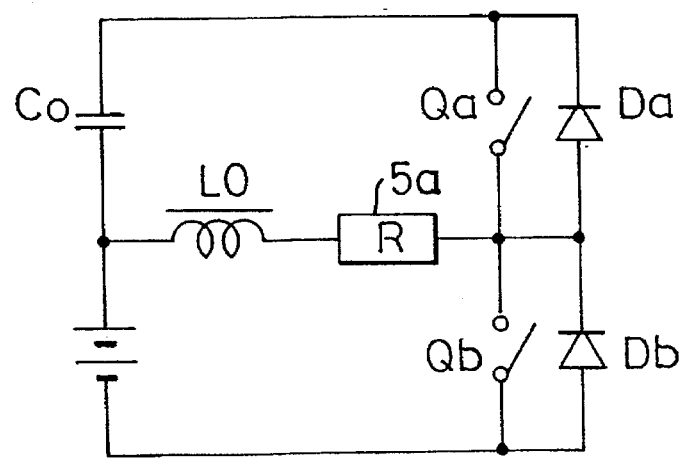
FIG. 3 is a circuit diagram of another form of the present invention employing the basic arrangement of FIG. 1.

Basic circuit configurations of the high-frequency inverter means 2 used in the power supply apparatus of FIG. 1 are shown in FIGS. 2 and 3. It will be noted that the connection position of the boosting capacitor Co in FIG. 2 is different from that in FIG. 3.

With the above arrangement of the invention, the high-frequency inverter means 2 for converting a D.C. voltage to a high-frequency voltage moves magnetic energy stored in a circuit impedance during ON and OFF operation of the switching element device 8 to the boosting capacitor Co to obtain a boosted voltage and applies the boosted voltage to the load circuit 7. In the circuit of FIG. 2, when a transistor Qb is turned ON, energy is supplied from a D.C. power source 1 to the load 5a and stored in the inductor L0; whereas, when the transistor Qb is turned OFF, the energy of the inductor L0 is moved to the boosting capacitor Co through a diode Da and a transistor Qa to boost the voltage across the boosting capacitor Co. When the transistor Qa is turned ON, the energy stored in the boosting capacitor Co is sent to the load 5a. A difference between FIGS. 2 and 3 in operation is that when a current flowing through the boosting capacitor Co, whether the current passes through the D.C. power source 1 or not.

In such a power supply apparatus including the transformer Tf as shown in FIG. 1, application of the boosted voltage across the boosting capacitor Co to the primary winding side of the transformer Tf can decrease the winding turn ratio of the transformer Tf, leading to realization of a small-sized power supply apparatus. Although a high voltage has been induced in a secondary winding side only by the boosting means based on a turn ratio in a known general transformer, the cooperative action of a boosting means by the boosting capacitor Co provided in the primary winding side of the transformer Tf and a boosting means by the turn ratio of the transformer Tf enables the burden of the transformer Tf to be lightened, the turn ratio of the transformer Tf to be decreased and the size of a resultant power supply apparatus to be made small in the present invention.

Figure 4:
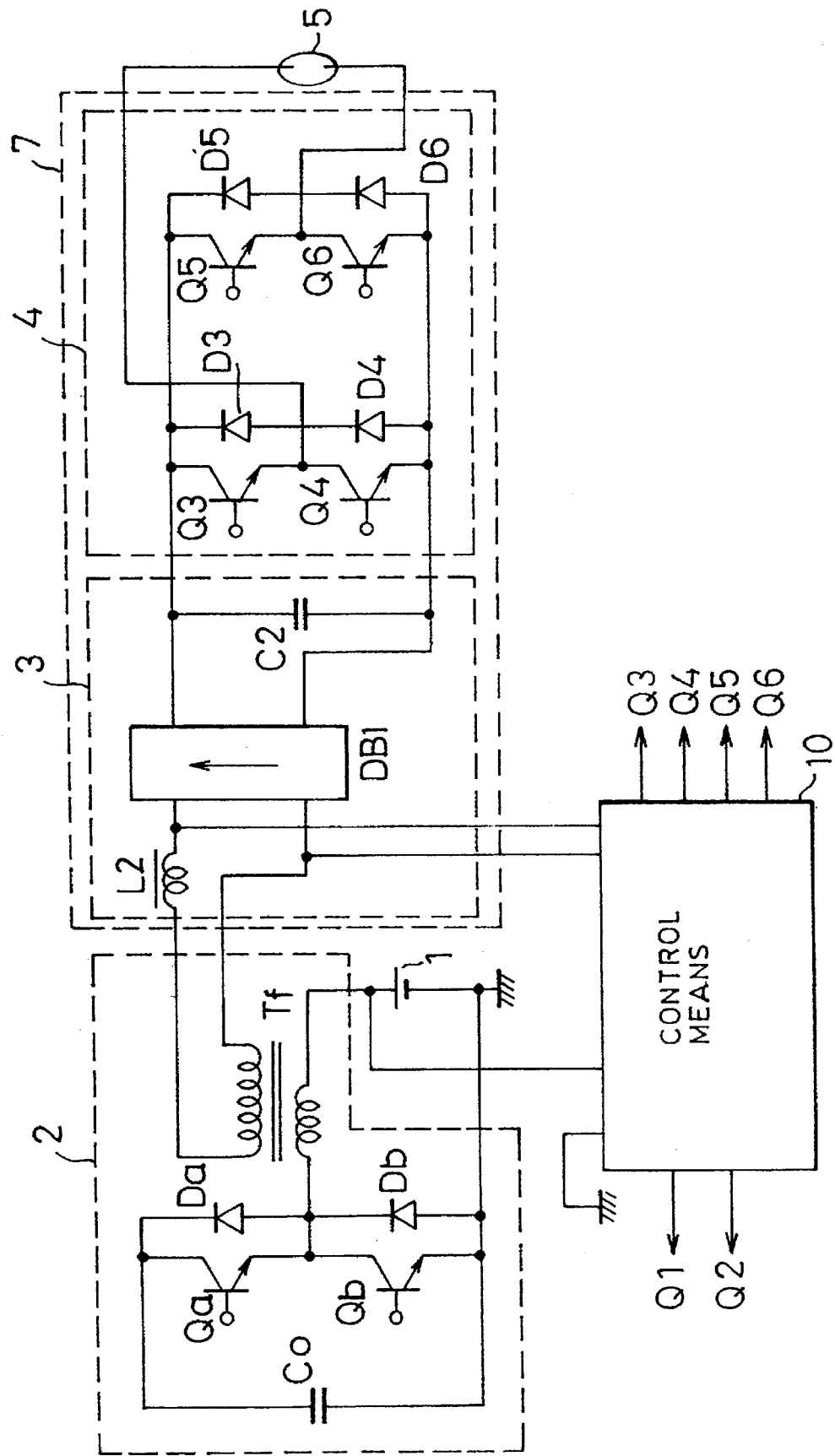
FIG. 4 is a circuit diagram of a power supply apparatus in accordance with an embodiment of the present invention.

Shown in FIG. 4 is a detailed circuit diagram of an embodiment 1 of the present invention, which includes a boosting inverter circuit 2 having a boosting function other than the boosting function based on the transformer Tf. The load circuit 7 connected to the secondary winding of the transformer Tf includes a rectified-current smoothing circuit 3 and a second inverter circuit 4 and functions to light the load 5 such as a discharge lamp connected to output ends of the second inverter circuit 4. Connected to an input side of a rectification circuit DB1 is a filtering choke coil L2. In this connection, the load circuit 7 is not limited to the illustrated circuit configuration but may have any circuit configuration, so long as it functions to drive the load circuit 7 requiring a high voltage from a low D.C. voltage power source 1.

More in detail, the boosting inverter circuit 2 comprises a pair of bidirectional switching elements having npn type transistors Qa and Qb connected between their emitter and collector with diodes Da and Db in an inverse parallel relation thereto, a series circuit of the both switching elements being connected between both ends of the boosting capacitor Co, the transistor Qb on a low voltage side being connected at its collector with a positive terminal of the D.C. power source 1 through the primary winding of the transformer Tf, a negative terminal of the D.C. power source 1 being connected to the emitter of the transistor Qb. The both transistors Qa and Qb are alternately turned ON and OFF under the control of a control circuit 10 to prevent the simultaneous turning ON of the both transistors. The control circuit 10 also controls the ON and OFF operations of transistors Q3 to Q6 in the load circuit 7. Further, a switching frequency fsw at which the transistors Qa and Qb are turned ON and OFF is set to be higher than a resonance frequency fLC of a resonance circuit having the primary winding of the transformer Tf and the boosting capacitor Co (fsw>fLC).

When the transistor Qb is now turned ON, this causes establishment of a closed circuit of the D.C. power source 1, the primary winding of the transformer Tf and the transistor Qb to thereby supply power to the load circuit 7 through the transformer Tf. When the transistor Qb is turned OFF, this causes the energy stored in the transformer Tf and the inductance of the secondary winding of the transformer to be discharged through a route of the primary winding of the transformer Tf, diode Da, boosting capacitor Co, D.C. power source 1 and again the primary winding of the transformer Tf, so that the boosting capacitor Co is charged with a voltage corresponding to a sum of the voltage of the D.C. power source 1 and a voltage across the primary winding of the transformer Tf. That is, this means that the voltage across the boosting capacitor Co is boosted higher than the voltage of the D.C. power source 1.

Next, when the transistor Qa is now turned ON, this causes establishment of a closed circuit of the boosting capacitor Co as a power source, transistor Qa, the primary winding of the transformer Tf and D.C. power source 1 to thereby supply power to the load circuit 7 through the transformer Tf. Thereafter, when the transistor Qa is turned OFF, this causes establishment of a closed circuit of the primary winding of the transformer Tf, D.C. power source 1 and diode Db, whereby a current flows through the primary winding of the transformer Tf.

The repetition of the above operations based on the ON and OFF operations of the transistors Qa and Qb causes the voltage across the boosting capacitor Co to be higher than the voltage of the D.C. power source 1, so that a high voltage is applied to the primary winding of the transformer Tf. Thus, when the high voltage becomes equal to a voltage induced in the secondary winding of the transformer Tf, the turn ratio of the transformer Tf can be made smaller than that of the general inverter circuit configuration. In other words, the transformer Tf can be made small in size and thus the entire size and/or weight of the power supply apparatus can be made small.

It is assumed now that the transistor Qa is set to have an ON time Ta, the transistor Qb is to have an ON time Tb, and a relationship of Ta<Tb is satisfied. Then the voltage across the boosting capacitor Co is in its boosting direction so that the above ON times Ta and Tb can be adjusted according to the voltage of he D.C. power source 1 and a voltage required by the load circuit 7 to meet the conditions of the load circuit 7. Further, when the switching frequency fsw of the transistors Qa and Qb is set to be higher than the resonance frequency fLC of the resonance frequency of the resonance circuit established by the primary winding of the transformer Tf and by the boosting capacitor Co, ripples in the voltage across the boosting capacitor Co can be suppressed so that the voltage across the boosting capacitor Co can be regarded substantially as a constant voltage.

Figure 50:
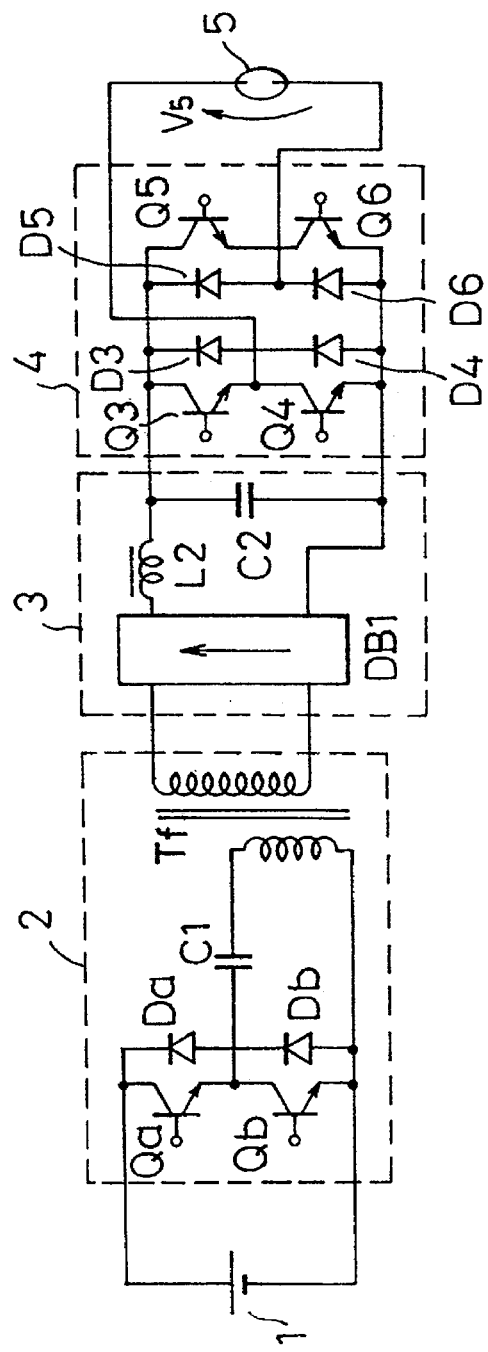
FIG. 50 is a circuit diagram of an arrangement of a prior art power supply apparatus.
Figure 51:
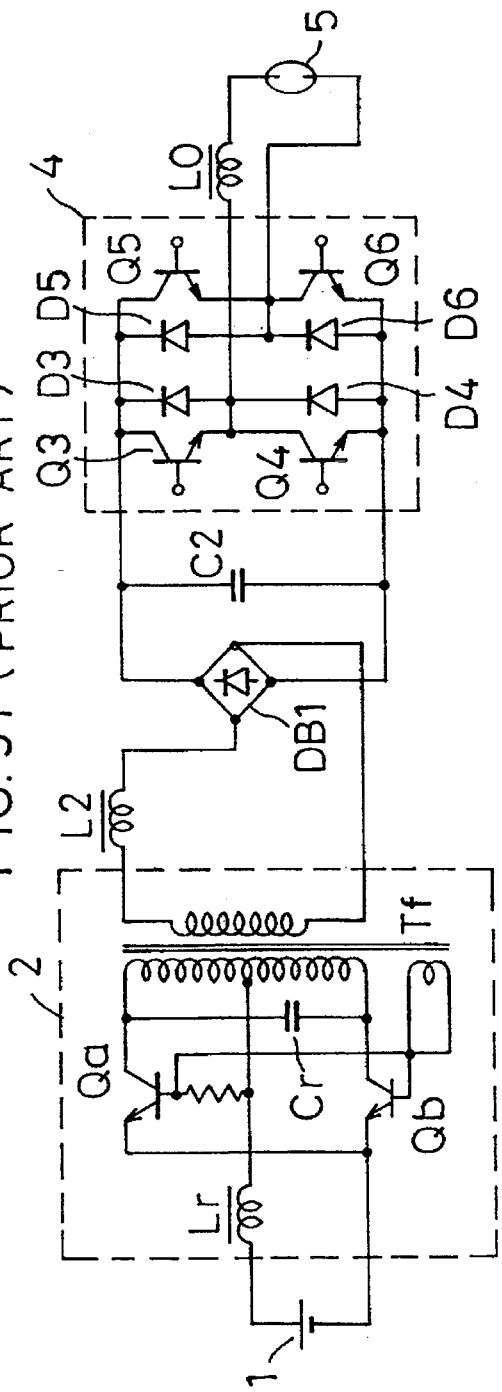
FIG. 51 is a circuit diagram or an arrangement of another prior art power supply apparatus.
Figure 52:
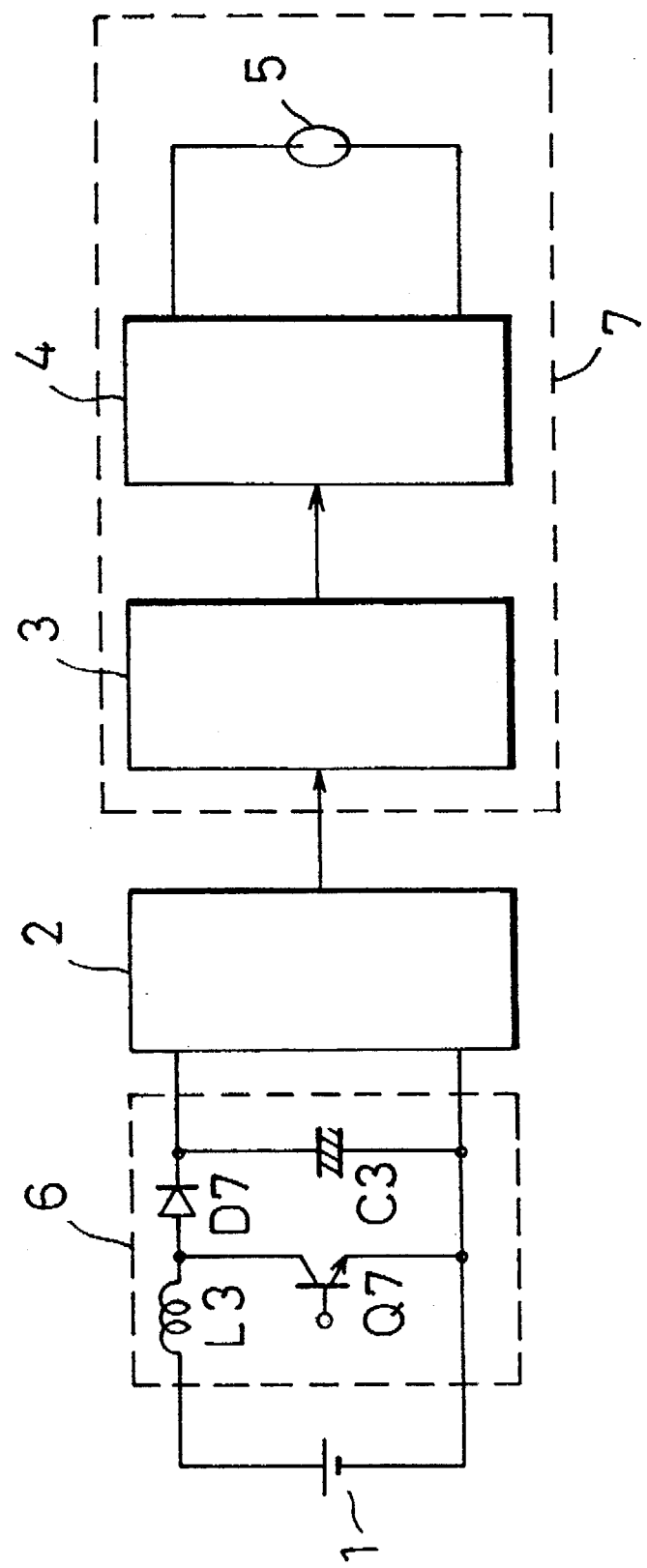
FIG. 52 is a circuit diagram of an arrangement of a further prior art power supply apparatus.
Figure 53:
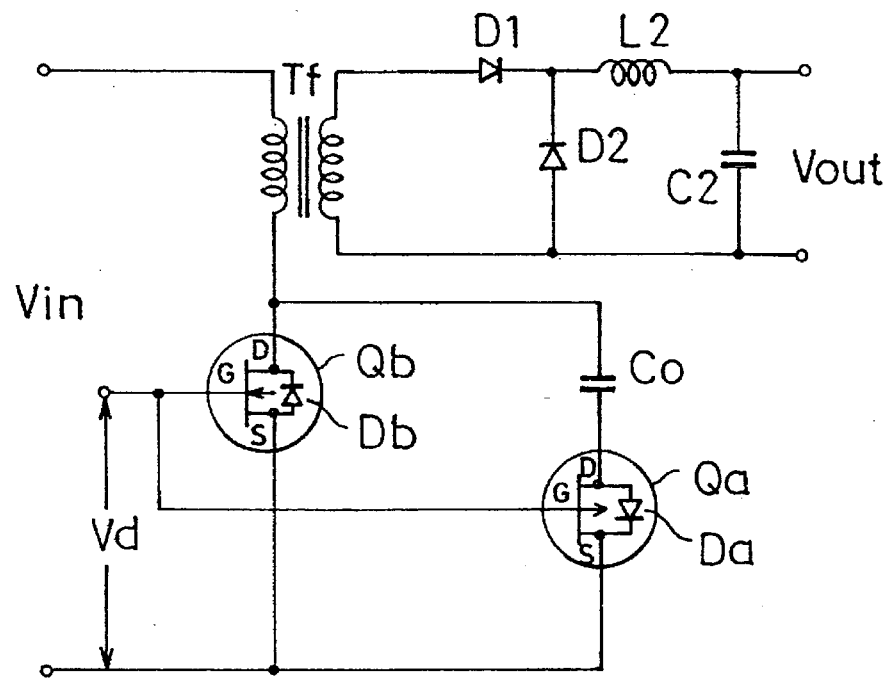
FIG. 53 is a circuit diagram of an arrangement of yet another prior art power supply apparatus.
Figure 54:
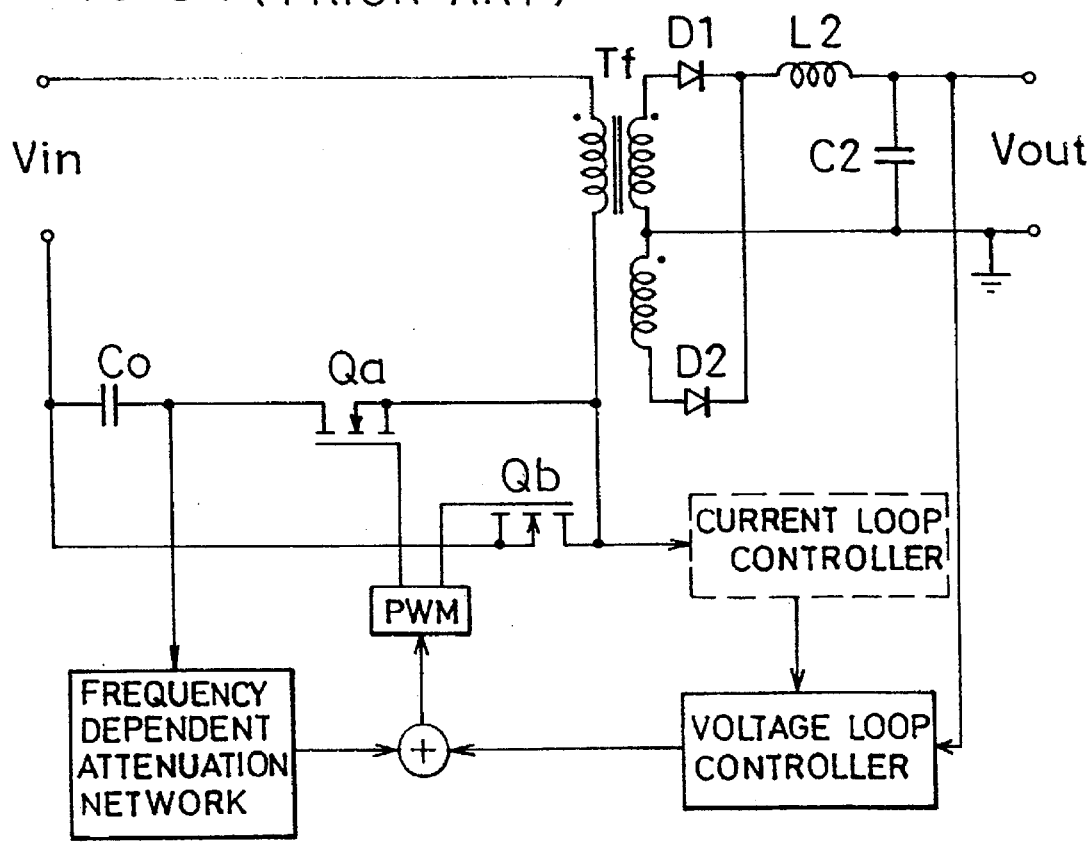
FIG. 54 is a circuit diagram of an arrangement of yet a further prior art power supply apparatus.

In the circuit arrangement of the general power supply apparatus as shown in FIG. 50, only about half the voltage of the D.C. power source was able to be applied to the primary winding of the transformer Tf. In the present embodiment, on the other hand, a voltage equal to or higher than the voltage of the D.C. power source 1 can be applied to the primary winding of the transformer Tf. As a result, the present embodiment can make the turn ratio of the transformer half or less than that of the general power supply apparatus and thus can make the entire power supply apparatus compacter.

Figure 5:
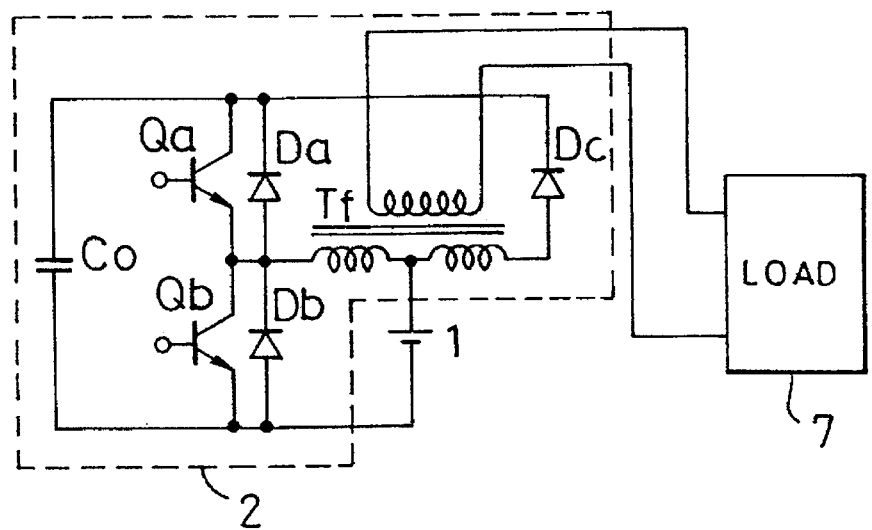
FIG. 5 is a circuit diagram of a second embodiment of the present invention.

Referring to FIG. 5, there is shown an embodiment 2 in accordance with the present invention, in which a transformer corresponds to the transformer Tf in the arrangement of the embodiment 1 but which primary winding is provided with a tap, such wiring as in the primary winding of the embodiment 1 is done to one end of the primary winding with respect to the tap, and the other end of the primary winding with respect to the tap is connected with a positive end of the boosting capacitor Co through a diode Dc. This arrangement is different from the embodiment 1 in that the boosting capacitor Co is charged through the transformer Tf and both diodes Da and Pc, but other arrangement and operation are substantially the same as those of the embodiment 1.

Figure 6:
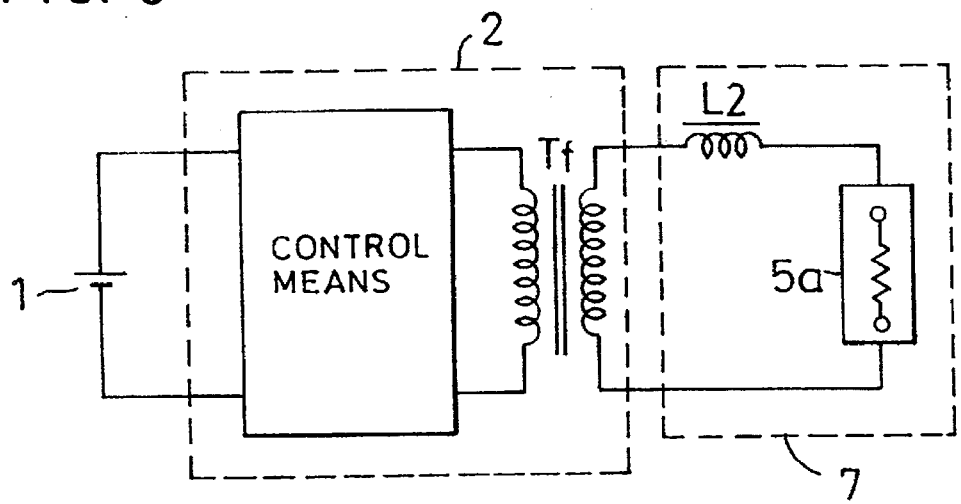
FIG. 6 is a circuit diagram of another example of a load circuit used in the embodiment of the present invention.
Figure 7:
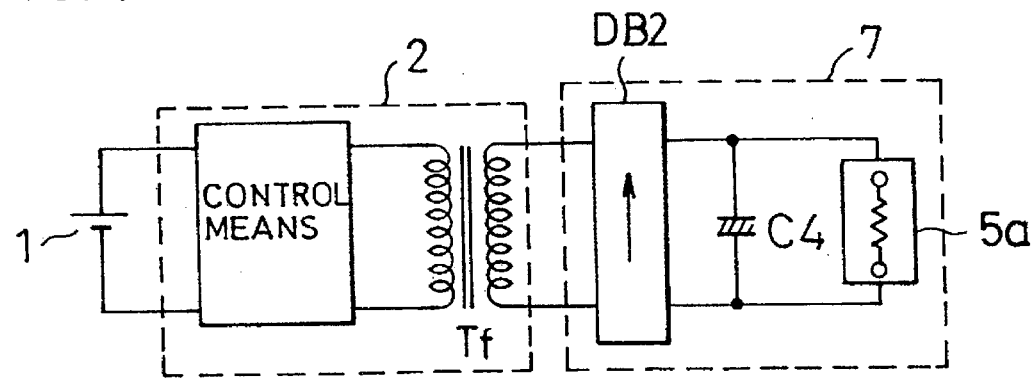
FIG. 7 is a circuit diagram of a further example of a load circuit used in the embodiment of the present invention.

The load circuit 7 is of a general type in each of the foregoing embodiments 1 and 2. However, when the load circuit 7 is made up of the load 5a to which an A.C. voltage is applied as shown in FIG. 6, the load 5a may be connected to the secondary winding of the transformer Tf only through and a current limiting inductor L2. Alternatively, as shown in FIG. 7, a D.C. voltage is applied to the load 5a so that a secondary winding output of the transformer Tf is rectified by a rectification circuit DB2 formed as a diode bridge, smoothed by a smoothing capacitor C4, and then applied to the load 5a through the smoothing capacitor C4.

Figure 8:
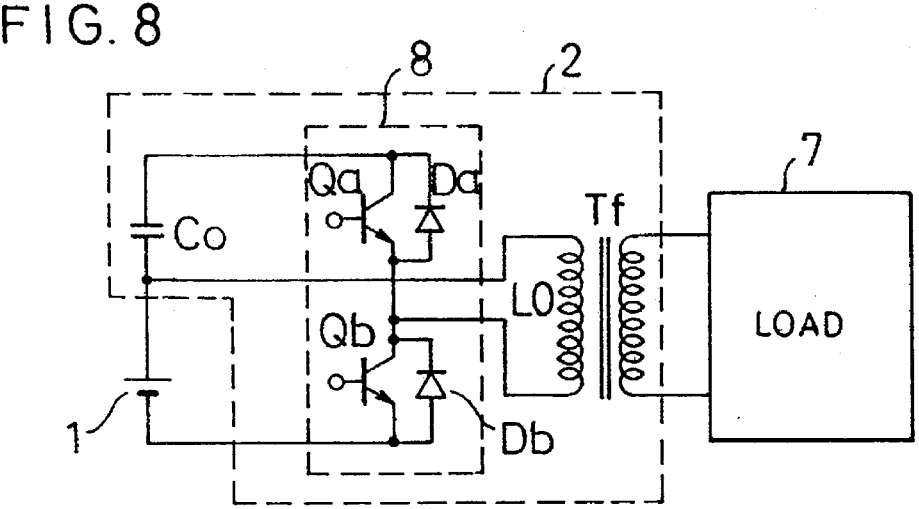
FIG. 8 is a circuit diagram of a third embodiment of the present invention.

Shown in FIG. 8 is an embodiment 3 of the present invention, in which turning ON of the transistor Qb first causes establishment of a closed circuit of the D.C. power source 1, primary winding L0 of the transformer Tf and transistor Qb to thereby supply power to the load circuit 7 through the transformer Tf. Turning OFF of the transistor Qb then causes the energy stored in the transformer Tf and the inductance of the secondary winding to be discharged through a closed circuit of the primary winding L0, diode Da and capacitor Co and then moved to the capacitor Co to boost the voltage of the capacitor Co. Next, the turning ON of the transistor Qa causes establishment of a closed circuit of the capacitor Co, transistor Qa and primary winding L0 to thereby supply power to the load circuit 7 through the transformer Tf from the capacitor Co as a power source. The turning OFF of the transistor Qa causes a current to flows from the primary winding L0 through a closed circuit of the primary winding L0, D.C. power source 1 and diode Db. Through the repetition of the above operation, the voltage of the capacitor Co is boosted so that a high voltage is applied to the primary winding L0, whereby the turn ratio of the transformer Tf can be decreased to a large extent. In particular, when the ON time of the transistor Qb is set to be larger than the ON time of the transistor Qa, the capacitor Co is in its boosting direction. Therefore, the ON time is only required to be set according to the load voltage. Even in the arrangement of the present embodiment, a voltage equal to or higher than the power source voltage can be applied to the transformer Tf and the turn ratio can be reduced to half or less, whereby the transformer Tf can be made small in size.

Figure 9:
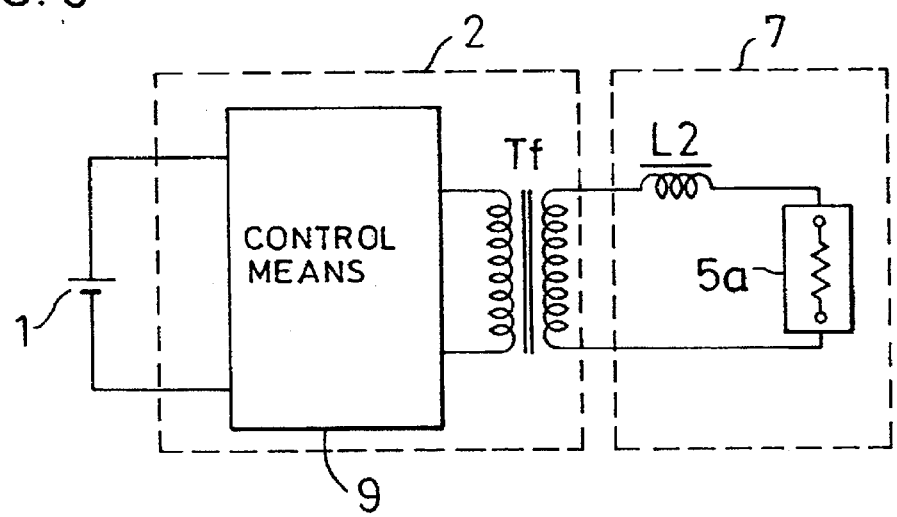
FIG. 9 is a circuit diagram of another example of a load circuit used in the third embodiment of FIG. 8 of the present invention.
Figure 10:
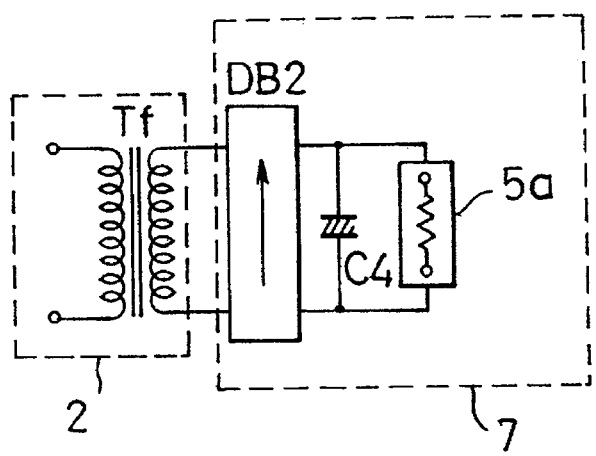
FIG. 10 is a circuit diagram of a further example of a load circuit used in the third embodiment of FIG. 8 of the present invention.

In an embodiment 3 of FIG. 8, such a load circuit 7 as shown in FIG. 9 is employed. In the present embodiment, a high frequency output is applied to the load 5a through a current limiting inductor L2 to carry out power control. Such a circuit arrangement may be employed that the load 5a of the load circuit 7 is driven on D.C. power as shown in FIG. 10. In this case, an input voltage is converted into a D.C. voltage by a rectification/smoothing circuit made up of a diode bridge and the capacitor C4 and then supplied to the load 5a as D.C. power.

Figure 11:
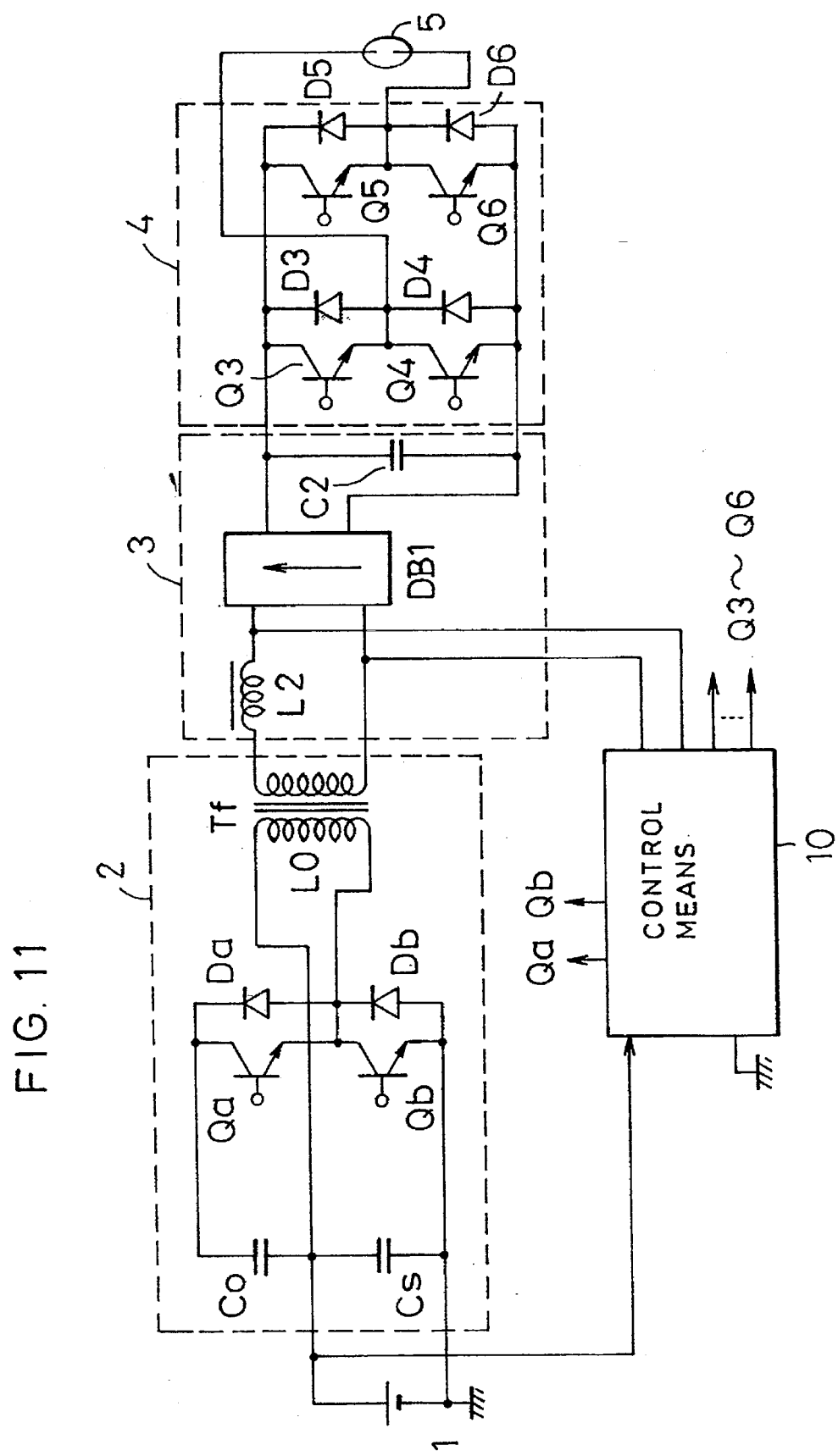
FIG. 11 is a specific circuit diagram of a discharge lamp lighting system implemented as the third embodiment of FIG. 8 of the present invention.

FIG. 11 shows a specific example in which the power supply apparatus of the embodiment 3 is applied to a discharge lamp lighting system for rectangular-wave lighting of a high pressure discharge lamp as the load 5. In this case, the voltage of the D.C. power source 1 is maintained by a capacitor Cs. This is advantageous when the D.C. power source 1 is positioned away from the power supply apparatus, e.g., as in a lamp lighting system of a vehicle for front illumination, because this arrangement can suppress the influences of the wiring impedance or noise. Further, a current limiting choke coil L2 acts to control a current flowing through the load 5. In this case, a control circuit 10 detects an output voltage and according to the detected value, controls the pulse width of the transistors Qa and Qb. The transistors Q3 to Q6 are driven at low frequency, e.g., at several hundreds of Hz so that the transistors Q3, Q6 and the transistors Q4, Q5 are alternately turned ON and OFF. A smoothing capacitor C2 is provided to cut harmonics components in the high-frequency inverter means 2 and to pass a current having less harmonics components through the discharge lamp as the load 5 for stabilization of its discharging operation. It will be appreciated that, since the voltage across the capacitor Co can be boosted, the transformer Tf can be made compact, thus resulting in realization of miniaturization and weight reduction of the overall lamp lighting system.

The capacitor Co provided on the primary winding side of the transformer Tf acts to minimize ripple components in the voltage thereacross because it functions as a power source. To this end, the switching frequency of the transistors Qa and Qb is set to be higher than the resonance frequency determined by an equivalent inductance component as viewed from the primary winding side of the transformer Tf and by the capacitor Co.

Meanwhile, when the load impedance varies in a range of from several-several hundreds of ohms to infinity (non-load state) in its OFF mode as in the high-pressure discharge lamp of FIG. 11, the resonance frequency as viewed from the primary winding side becomes maximum when the secondary winding is short-circuited and satisfies the following relationship.

$$f_{max} = (1/2\pi)\sqrt{\{(1/L0 + n^2/L2)/C0\}}$$

Thus, the switching frequency fsw of the transistors Qa an Qb is set to be higher than the maximum resonance frequency fmax. Assuming for example that L2=200 μH, C0=2 μF, the primary winding reactance L0 of the transformer Tf=10 μH and n=12, then the maximum resonance frequency becomes 102 kHz. It has been turned out that, when a rated load impedance is 200 Ω, ripple components in the voltage across the capacitor Co can be sufficiently suppressed, so long as the switching frequency is set to be 150 kHz or higher. Since the resonance frequency in a no load mode, which is determined by the inductor L0 and capacitor Co, becomes 36 kHz, while, when the load side (secondary winding side) is short-circuited (load 5 having a resistance of zero), the resonance frequency becomes about 100 kHz so that, when the switching frequency fsw of the transistors Qa and Qb is 1.5 times or more the resonance frequency in the shorted secondary winding mode, stable and favorable operation can be established.

Figure 12:
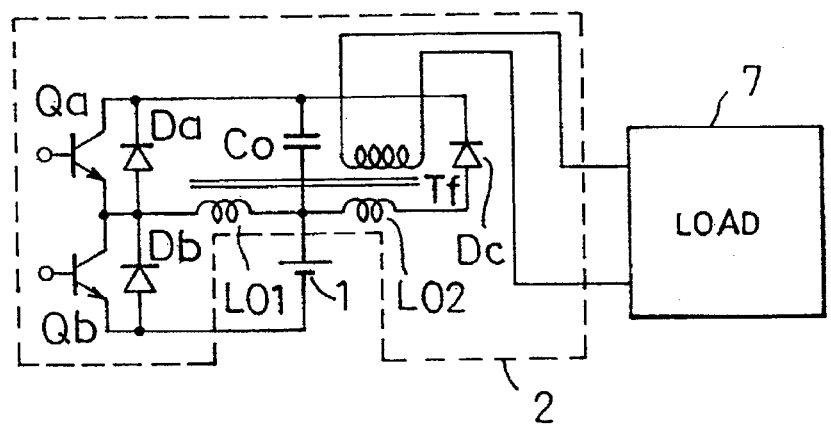
FIG. 12 is a circuit diagram of a fourth embodiment of the present invention.

Shown in FIG. 12 is an embodiment 4 of the present invention, in which two windings are provided in the primary winding side of the transformer Tf so that, when the transistor Qb is turned-ON, the voltage across the capacitor Co is boosted through a closed circuit of a primary winding L02 of the transformer Tf, a diode Dc and capacitor Co, while, even when the transistor Qb is turned OFF, energy is stored through a closed circuit of a primary winding L01 of the transformer Tf, diode Da and capacitor Co. Thus, the present embodiment can advantageously produce a relatively high output voltage easily. For example, even when a power source voltage is low (as when the power source voltage drops from its rated voltage, etc.), the voltage of the capacitor Co can be kept at a high level, thus broadening its output range.

Figure 13:
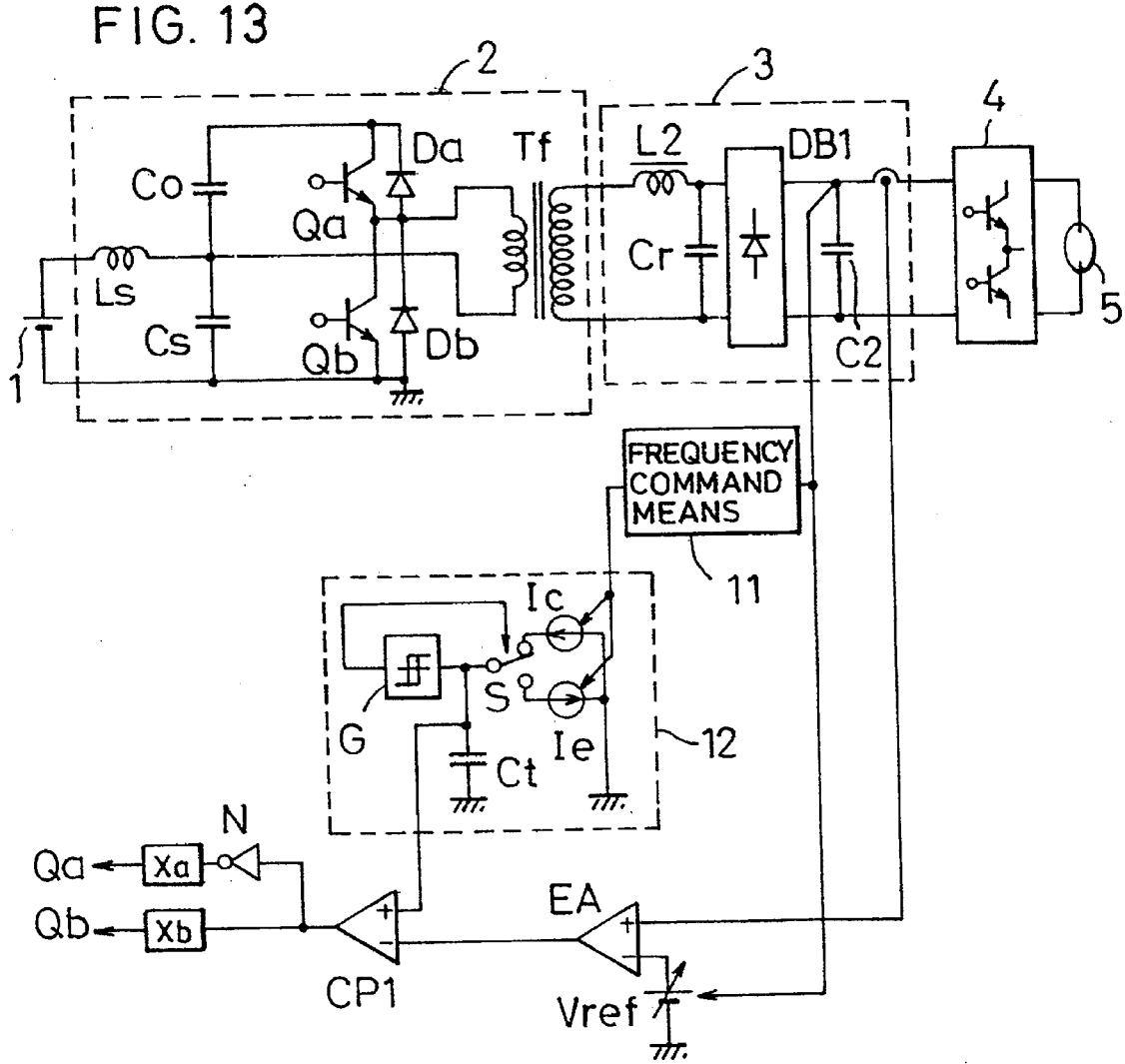
FIG. 13 is a circuit diagram of a fifth embodiment of the present invention.

FIG. 13 is a circuit diagram of an embodiment 5 of the present invention, wherein the current limiting inductor L2 is connected between the secondary winding of the transformer Tf and the rectification circuit DB1 in the high frequency inverter means 2. Also connected as the load is the high-pressure discharge lamp 5 such as a metal halide lamp. The load voltage when the lamp is in its ON mode is, e.g., about 85 V, while, the load voltage is required to be as relatively high as about 300 V to start the lamp in a no load mode. To satisfy this, when the number of turns in the secondary winding of the transformer Tf is increased, this results in increase of the primary winding current in the lamp ON mode. Therefore, in the present embodiment, a resonance capacitor Cr is connected between the current limiting inductor L2 and a rectification circuit DB1 in parallel thereto, so that, in a no load mode, resonance is established between the current limiting inductor L2 and resonance capacitor Cr to obtain a resonance voltage that is used to obtain a high no load voltage. Since a current flowing through the resonance capacitor Cr decrease in a stationary lamp ON mode, it is preferable that the resonance capacitor Cr have a small capacitance.

Power control in a rated load mode is carried out by comparing an output of an error amplifier EA with a triangle wave of a triangle-wave oscillator 12 at a comparator CP1 to generate a PWM signal and by using the PWM signal to control the duty ratio of the transistors Qa and Qb. In the present embodiment, driver circuits Xa and Xb are provided. The triangle-wave oscillator 12 includes a capacitor Ct, a Schmitt circuit G for detecting a voltage across the capacitor Ct, a switch S for controllably performing its switching operation on the basis of an output of the Schmitt circuit G, a first current source Ic for charging the capacitor Ct, and a second current source Ie for discharging the capacitor Ct. When the charging from the first current source Ic causes the voltage across the capacitor Ct to increase and reach an upper limit value of the Schmitt circuit G, the switch S is invertedly switched. When the discharging to the second current source Ie causes the voltage across the capacitor Ct to drop to a lower limit value of the Schmitt circuit G, the switch S is again invertedly switched. This causes the charging and discharging of the capacitor Ct to be repeated to generate a triangle wave. The current values of the first current sources Ic and Ie are variably changed according to a command value input from a frequency command circuit 11 to thereby change the oscillation frequency of the triangle-wave oscillator 12.

Next, when the mode is changed to the no load mode (when the lamp load is turned OFF) and the output voltage (or the voltage across the capacitor C2) becomes equal to or higher than a set voltage, the frequency command circuit 11 issues a command value to the triangle-wave oscillator 12 in such a manner that the switching frequency fsw determined by the oscillation frequency of the triangle-wave oscillator 12 becomes somewhat higher than the resonance frequency determined by the current limiting inductor L2 and resonance capacitor Cr. The duty cycle in the no load mode is fixed to a certain set value so that adjustment of the output voltage is carried out by adjusting the frequency.

In such an embodiment as mentioned above, the current limiting inductor L2 and resonance capacitor Cr are provided on the secondary winding side of the transformer Tf and a suitable switching frequency is set so that the resonance action in the no load mode causes the voltage across the resonance capacitor Cr to rise and also causes a surge current to being prevented from flowing through the transistors Qa and Qb to suppress the stress.

Figure 14:
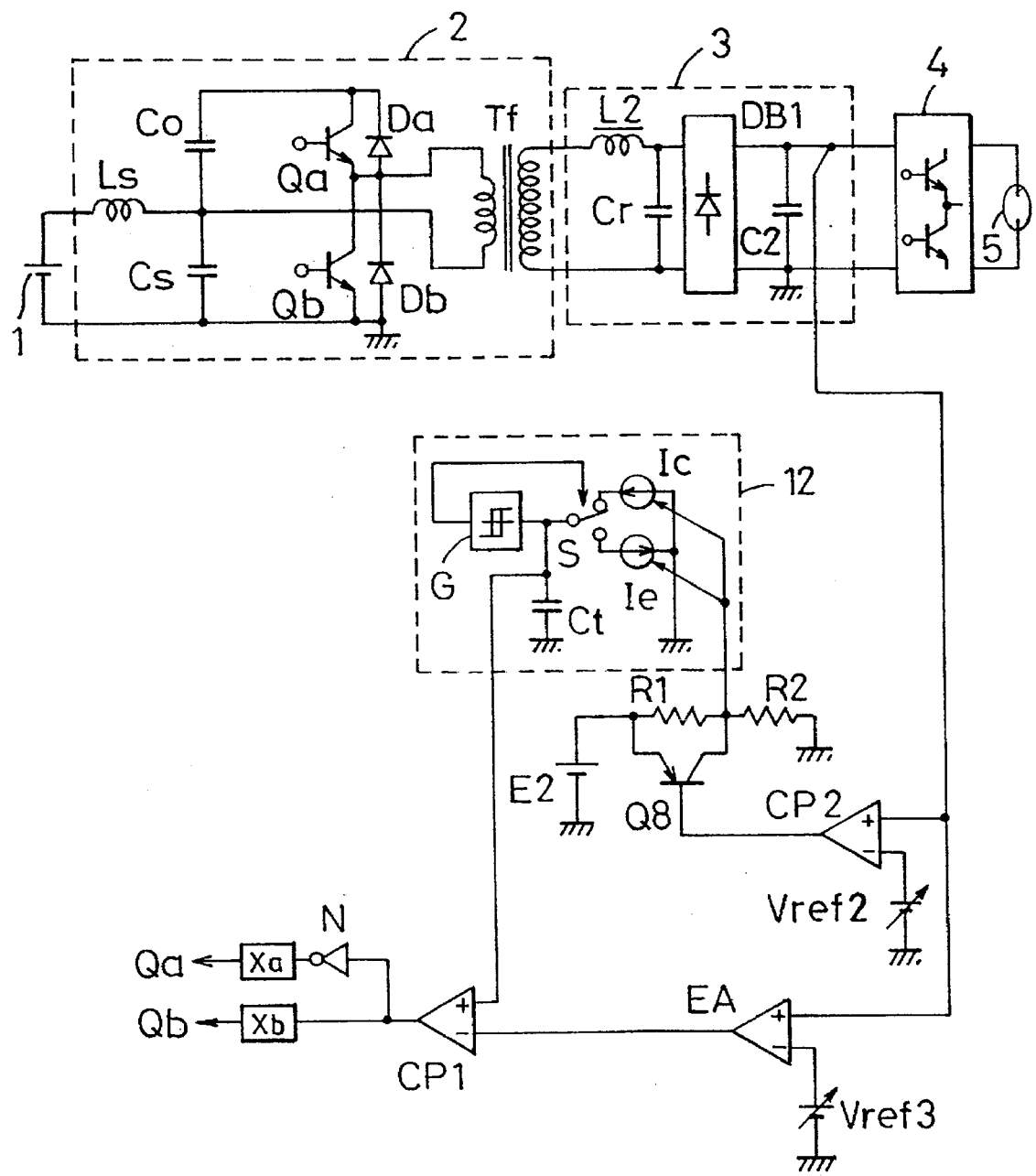
FIG. 14 is a circuit diagram of a sixth embodiment of the present invention.

In an embodiment 6 of the present invention shown in FIG. 14, the resonance capacitor Cr is connected between the current limiting inductor L2 and rectification circuit DB1 in parallel thereto so that resonance is established between the current limiting inductor L2 and resonance capacitor Cr in a no load mode to obtain a resonance voltage, and the resonance voltage is used to generate a high no-load voltage. For the purpose of decreasing a current flowing through the resonance capacitor Cr in a stationary ON mode, a capacitor having a small capacitance is employed as the resonance capacitor Cr. When the voltage across the capacitor C2 becomes as high as a certain level, the frequency of the triangle-wave oscillator 12 determining the switching frequency is switched to a level somewhat higher than the resonance frequency of the current limiting inductor L2 and resonance capacitor Cr. As a result, a comparator CP2 outputs a switching signal to cause the transistor Q8 to change the voltage division ratio of resistors R1 and R2, whereby an input voltage for frequency setting to the triangle-wave oscillator 12 is changed. The voltage adjustment is carried out by comparing the output of the error amplifier EA with an output of the triangle-wave oscillator 12 at the comparator CP1 to control the duty ratio of the transistors Qa and Qb. The duty control is advantageous over the frequency control of the transistors Qa and Qb in the noise suppression, so that the output voltage can be controlled relatively stably in the vicinity of the resonance frequency at which the control gain becomes high.

Meanwhile, when a high-pressure discharge lamp is used as the load, that is, when a load impedance varies over a wide range and a load voltage necessary for the lamp varies correspondingly over a wide range; and when such control is desired that the lower the load voltage is the more the output current increases as when much power output is desired at the time of constant power control or low impedance; the large turn ratio of the boosting transformer Tf increases the primary winding current, which undesirably involves increased loss or the necessity of increase in the capacity of the switching element. The increase of the primary winding current results from the fact that the turn ratio of the transformer Tf is not suitable for the output voltage of the transformer Tf. For this reason, it is favorable to employ such an arrangement that the turn ratio of the secondary winding is switched according to the output voltage, which embodiment will be explained below.

Figure 15:
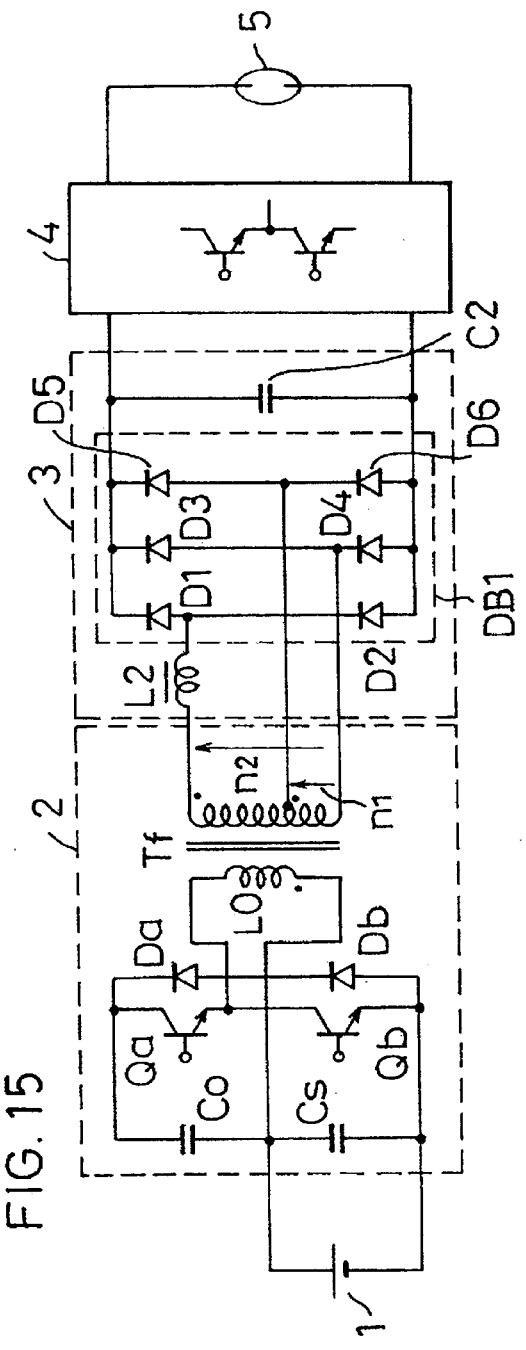
FIG. 15 is a circuit diagram of a seventh embodiment of the present invention.
Figure 16:
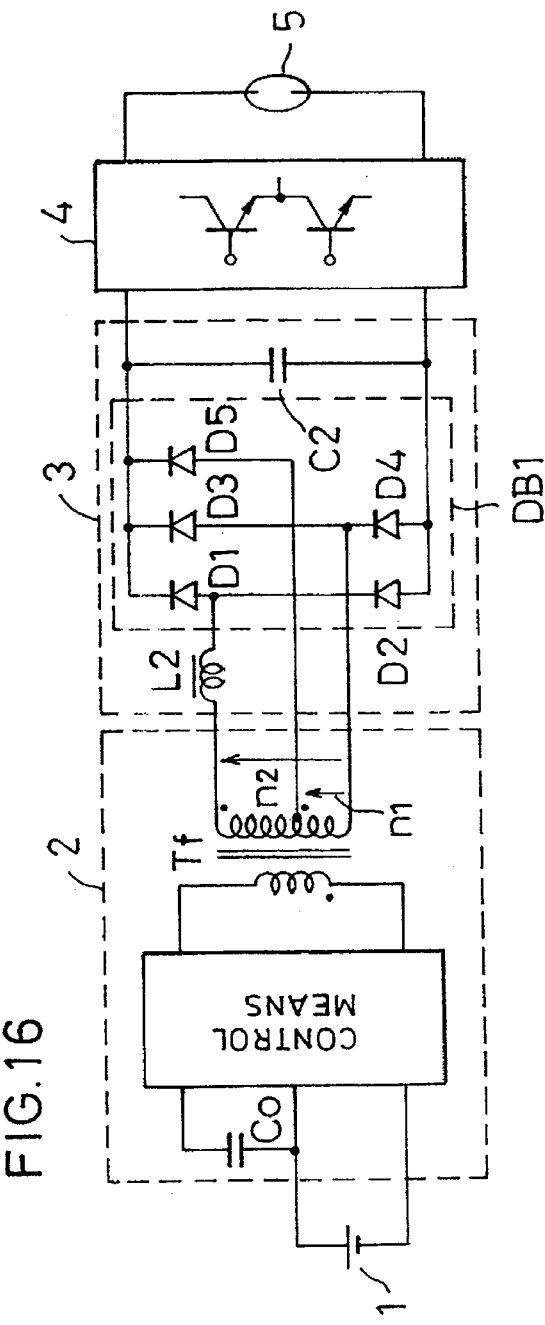
FIG. 16 is a circuit diagram of another form of the seventh embodiment of FIG. 15 of the present invention.

In an embodiment 7 shown in FIG. 15 in accordance with the present invention, the transformer Tf is provided in its secondary winding with an intermediate tap so that the switching action of the rectifying diode bridge DB1 based on a load voltage is utilized to change a current distribution to be extracted from the secondary winding terminal of the transformer Tf on the basis of the output voltage. With such an arrangement, when a load impedance is small and a load voltage is low, a current is output mainly from the intermediate tap (turn number: n1) in the secondary winding of the transformer Tf; whereas, when the load impedance is large and the load voltage is high, a current is output mainly from both ends (turn number: n2) of the secondary winding of the transformer Tf through the inductor L2.

With respect to the intermediate tap, it is preferable to set the intermediate tap position n1 in the secondary winding and the turn number n2 of the entire secondary winding to satisfy the following conditions, taking the power of the load into consideration.

Assume that the load has a maximum load impedance (except the no load mode and the OFF mode of a discharge lamp load) R in the operational range, an inductor L2 is connected to the secondary winding side of the transformer Tf and a switching frequency is set at $\omega/2\pi$. Then when the turn number n2 of the entire secondary winding and the intermediate tap position n1 are set to satisfy a relation of $(n1/n2) < \sqrt{\{R^2/(\omega^2 L2^2+R^2)\}}$, efficient power supply to the load can be attained and a current stress in the primary winding can be reduced remarkably. As a result, the transformer Tf or transistors Qa and Qb can be made small in size and cost.

Figure 17:
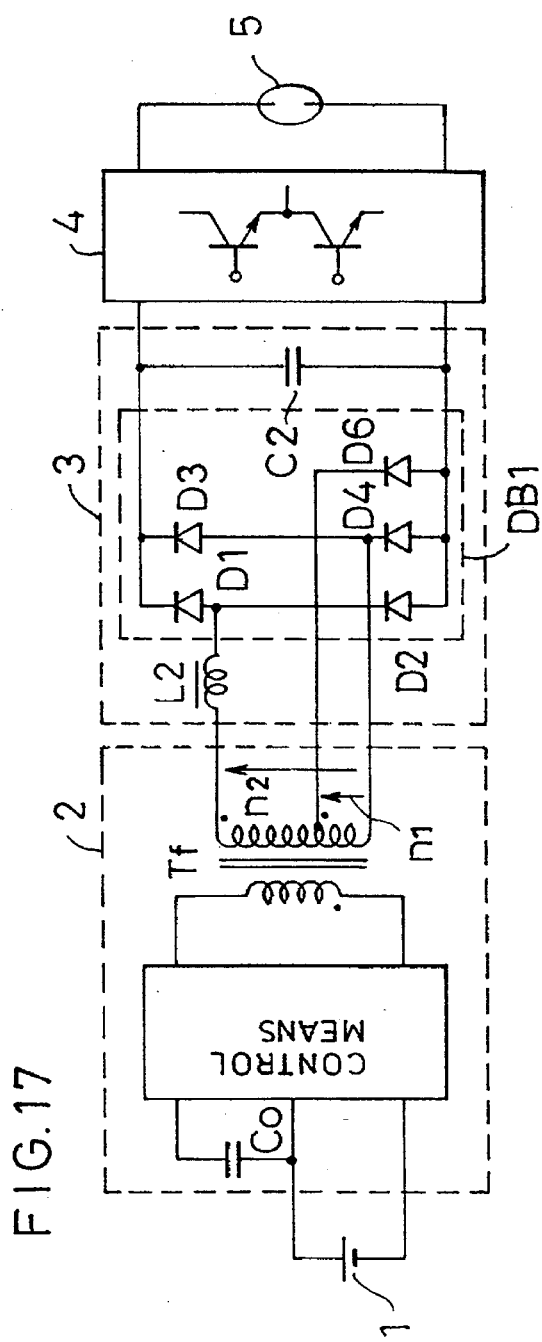
FIG. 17 is a circuit diagram of a further form of the seventh embodiment of FIG. 15 of the present invention.
Figure 18:
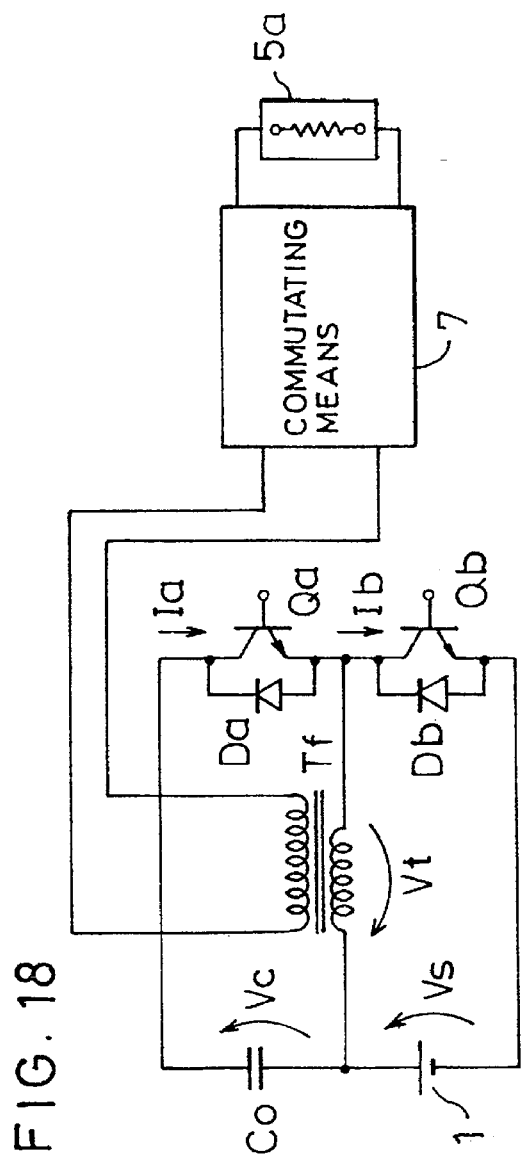
FIG. 18 is a circuit diagram of an eighth embodiment of the present invention.

As shown in FIGS. 18 and 17, even when the diode D6 or D5 in the diode bridge DB1 is removed from the embodiment of FIG. 15, substantially the same effects can be realized.

Figure 19:
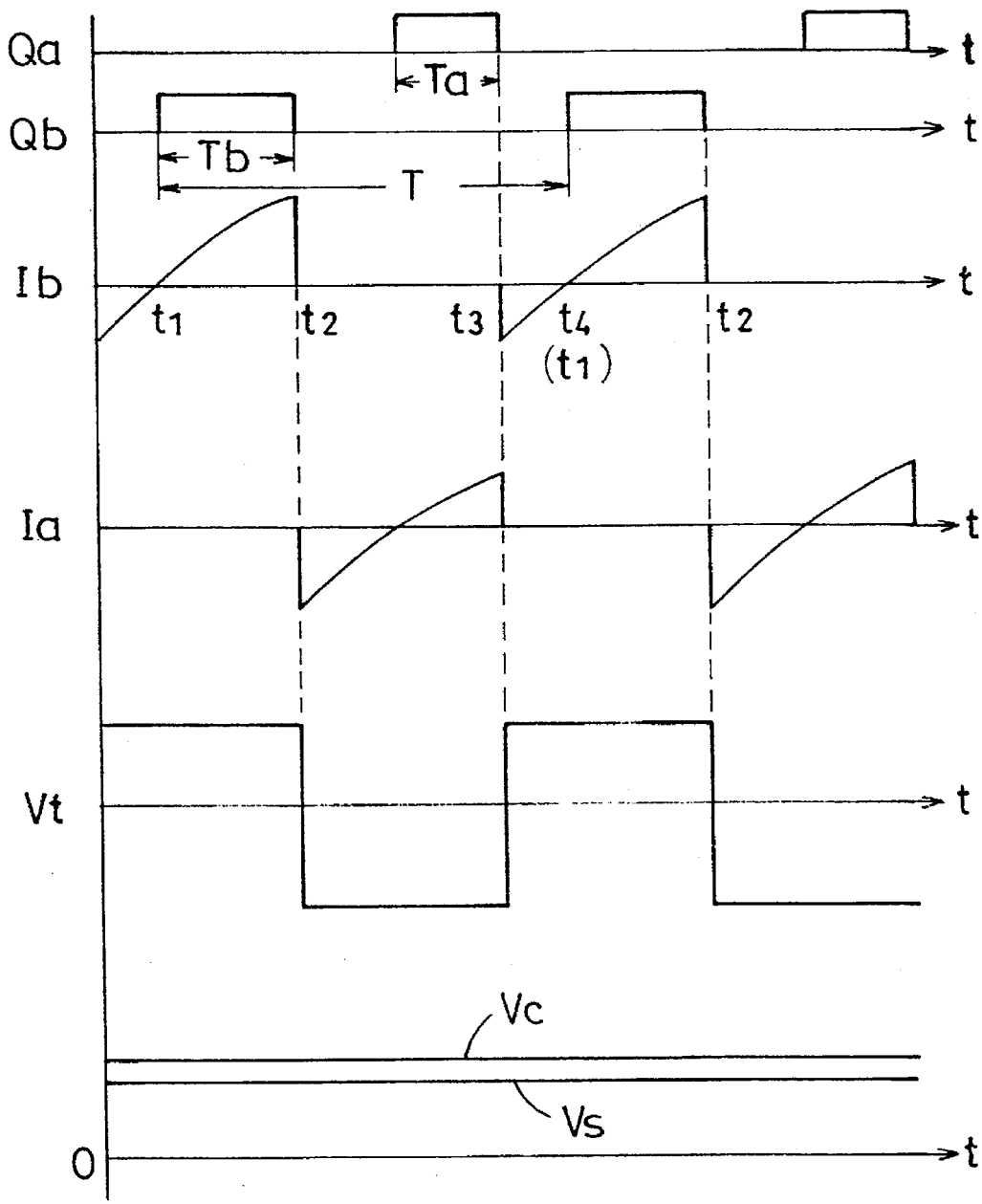
FIG. 19 shows waveforms of signals appearing in the eighth embodiment of FIG. 18 of the present invention.

In an embodiment 8 of FIG. 18 in accordance with the present invention, an ON time Ta of the transistor Qa and an ON time Tb of the transistor Qb are set to meet a relationship of Ta<Tb. When the ON time Tb of the transistor Qb is made longer than the ON time Ta of the transistor Qa to supply energy from the D.C. power source 1 to the transformer Tf, the turning OFF of the transistor Qb causes the energy of the transformer Tf to be charged into the capacitor Co, thus boosting the voltage across the capacitor higher than the voltage of the D.C. power source 1. In FIG. 19 showing waveforms of signals appearing in a stationary mode of the circuit of FIG. 18, the ON times Ta and Tb of the transistors Qa and Qb satisfy the relationship of Ta<Tb. The energy stored when the transistor Qb is turned ON is discharged, as soon as the transistor Qb is turned OFF, for the boosting action of the secondary winding side of the transformer Tf and the capacitor Co. A voltage Vc across the capacitor Co and a voltage Vs of the D.C. power source 1 satisfy a relationship of Vs<Vc as will be clear from FIG. 19. When the ON times Ta and Tb of the transistors Qa and Qb are controlled according to the state of the load 5a, the voltage across the capacitor Co can be boosted and maintained. Further, when this relationship is kept, control of the load power can be facilitated. As a result, the transformer Tf can be made compact and the stress imposed on the transistors Qa and Qb provided on the primary winding of the transformer Tf can be made much lightened. In addition, since the ON time control of the transistors Qa and Qb, i.e., so-called PWM control can be realized without changing the switching frequency, the present embodiment is advantageous in ease of the filter design and noise reduction. In this connection, the transistors Qa and Qb may comprise field effect transistors (FETs), in which case the FETs each incorporate a reverse-directed diode and thus the diodes Da and Db can be removed.

Figure 20:
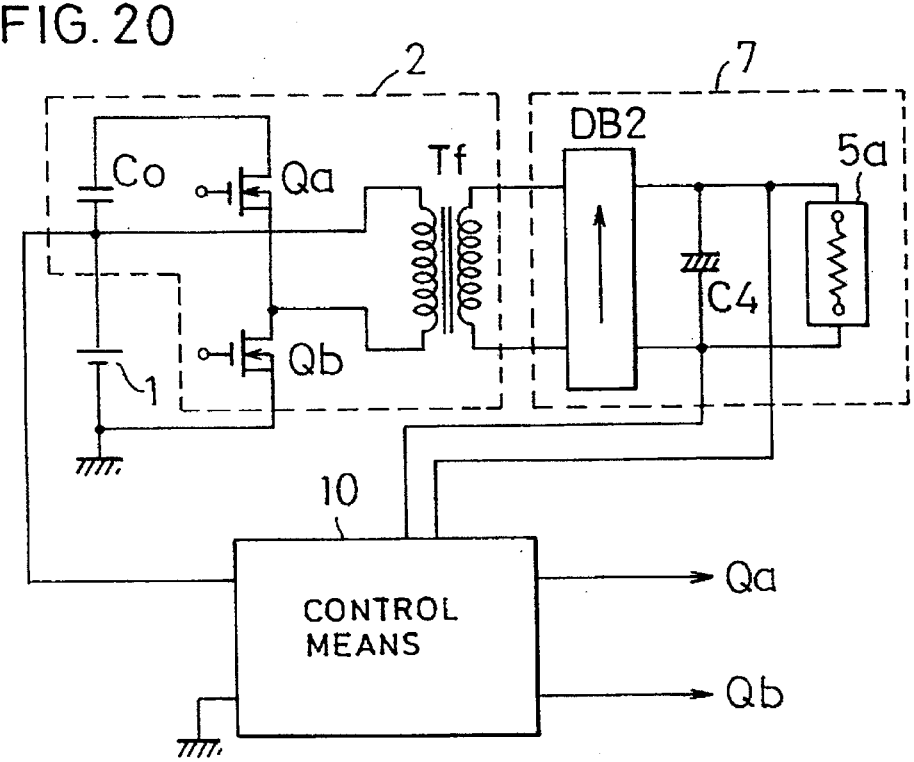
FIG. 20 is a circuit diagram of a ninth embodiment of the present invention.

In an embodiment 9 of FIG. 20 in accordance with the present invention, the transistors Qa and Qb comprise FETs and each incorporate a reverse-directed diode between its drain and source. With a high-frequency inverter circuit having a low power source voltage, when the output voltage is high and the output power is large, a large current flows through the primary winding of the transformer Tf, which requires use of such an element as to be low in breakdown voltage but high in breakdown current. Further, when the pulse width of the transistors Qa and Qb are arranged to be controlled to set the ON times of the respective transistors, in general, the ON times vary in a wide range and thus a breakdown current must be determined at its maximum duty cycle, thus resulting in that the switching elements become large and correspondingly a resultant power supply apparatus becomes expensive and bulky. In addition, the element having a large current capacity is generally slow in switching speed and also has a limit in its operational frequency. To avoid this, the present embodiment is designed so that the transistors Qa and Qb of the FETs operate independently of each other and the switching frequencies and ON times of the transistors are set to suppress stress imposed thereon.

Figure 21:
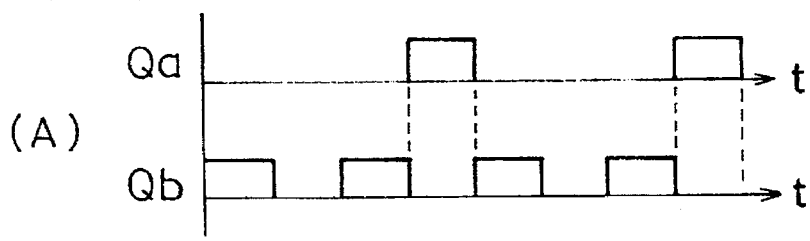
FIG. 21 shows waveforms of signals appearing in the ninth embodiment of FIG. 20 of the present invention.
Figure 21:
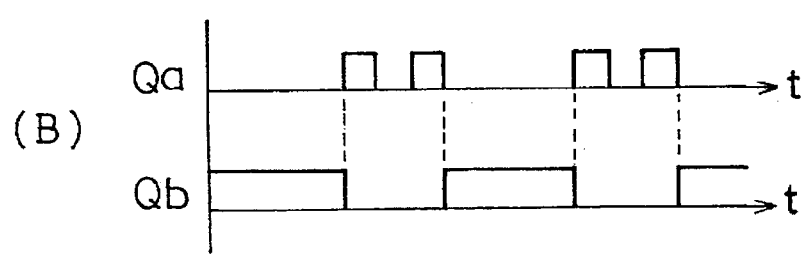
Figure 21:
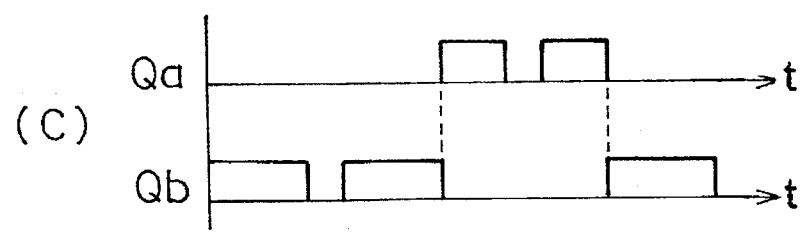

Shown in FIG. 21, (a) to (c) are waveforms of signals in different states of the embodiment 9 of FIG. 20. More specifically, in the state (a) of FIG. 20, the switching frequency of the transistor Qb is set to be higher than that of the transistor Qa, so that, even when the full ON time of the transistor Qb in one period is longer than the full ON time of the transistor Qa, the once ON time of the transistor Qb becomes shorter, whereby a current flowing through the transistor Qb immediately before the transistor is turned OFF can be reduced. In the state (b) of FIG. 21, the transistor Qa is operated at a frequency higher than the transistor Qb. In the state (c), such durations are provided that the transistors Qa and Qb are both independently turned ON and OFF. In this way, the entire ON time of the transistor Qb forming, when turned ON, a closed circuit with the D.C. power source 1 is longer than that of the transistor Qa in any of the states (a) to (c) of FIG. 15, whereby the voltage across the capacitor Co can be boosted to reduce the turn ratio of the transformer Tf. As a result, the D.C. breakdown current of the switching element can be made low, the apparatus cost can be made low and thus the apparatus can be made small in size. Further, since the peak value of the current can be suppressed, the stress imposed on the respective parts (including the transformer) can be reduced.

Figure 22:
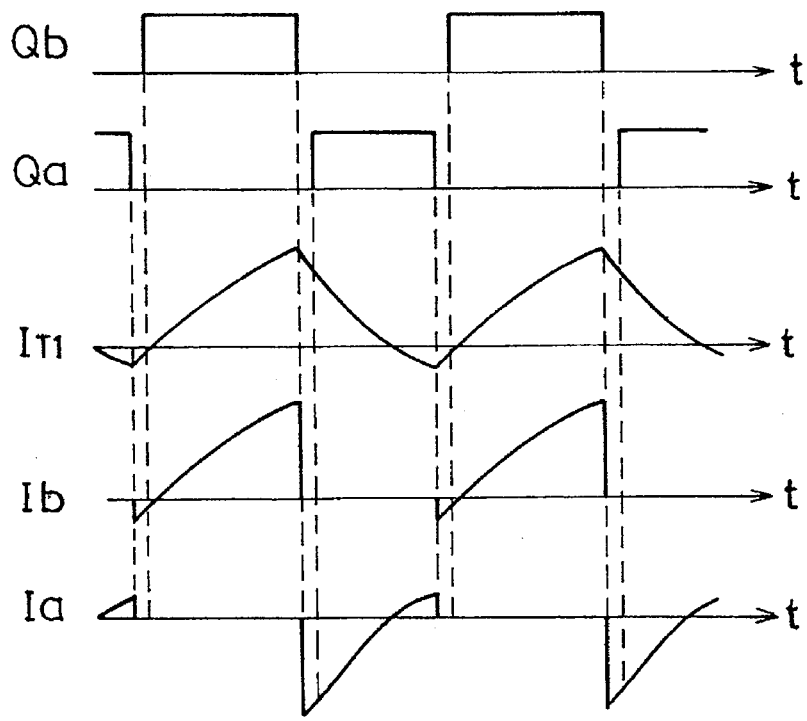
FIG. 22 shows waveforms of signals appearing in the third embodiment of FIG. 11 of the present invention in its stationary operational mode.
Figure 23:
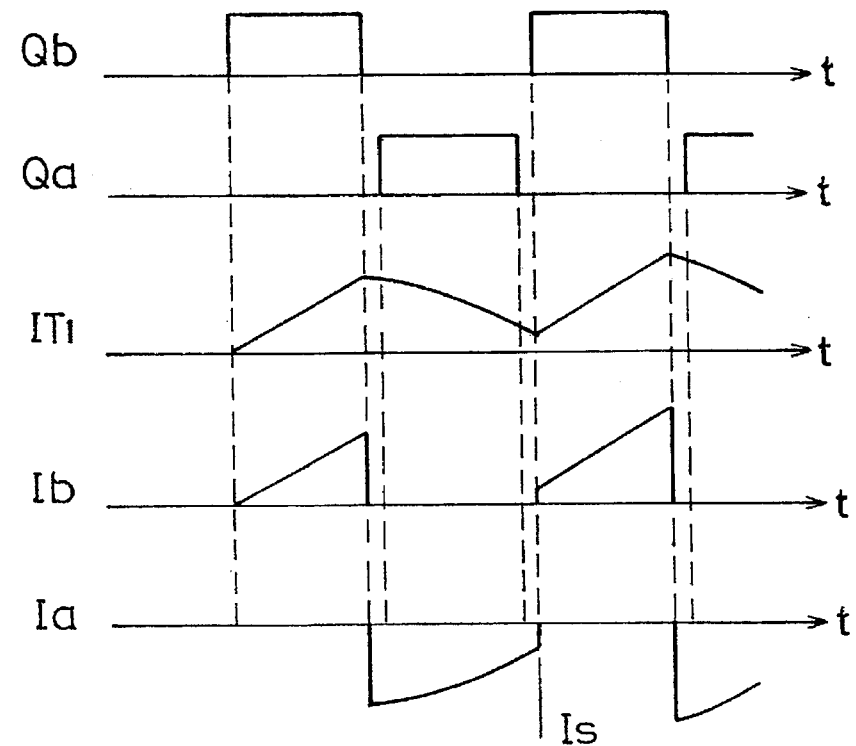
FIG. 23 shows waveforms of signals appearing in the third embodiment of FIG. 11 of the present invention in its start operational mode.

For better understanding of various embodiments of the power supply apparatus in accordance with the present invention, explanation will next be made as to the control of the switching frequency or as to the control of the duty cycle when the operation of the apparatus is shifted from its operation start mode to a stationary mode. In the basic embodiment shown in FIG. 11, the waveforms of current signals flowing through the switching elements (transistors Qa and Qb an diodes Da and Db) in the stationary mode are as shown in FIG. 22. In the drawing, reference symbol Ia denotes a current flowing through the transistor Qa (or diode Da), Ib a current flowing through the transistor Qb (or diode Db), $I_{T1}$ a primary current flowing through the transformer Tf. When the change of the transistor Qb from its ON state to OFF causes the energy stored in the respective inductances to be first charged into the capacitor Co through the diode Da, the voltages across the respective capacitors are low immediately after the apparatus is started, whereby the charging current flowing through the capacitor Co is gentle in the gradient of the attenuation waveform of the charging current to the capacitor Co. For this reason, the charging current flowing through the capacitor Co via the diode Da becomes zero, so that, before establishment of a current path in which charges in the capacitor Co are discharged to the load side through the transistor Qa, that is, while the charging current is flowing toward the capacitor Co, the current switching period is shift to the next one to turn ON the transistor Qb, which state is referred to as the grounded short-circuit state and in which a surge current Is flows as will be seen from FIG. 23. The generation of the surge current Is is for the following reason. That is, since the voltages across the capacitor Co and the capacitor (C2) in the load circuit are low, the change of the transistor Qa from its ON state to OFF causes the energy stored in the respective inductance components to be charged into the capacitor Co with a small attenuation factor. This results in that the charge completion duration becomes longer then the stationary duration, so that the energy stored in the respective inductances during the OFF period of the transistor Qb having the same duty cycle and switching frequency as those in the stationary mode set therefor cannot be fully discharged into the capacitor Co.

Accordingly, in order to reduce the stress caused by such surge current in the start mode, that is, to fully charge the energy stored in the respective inductances into the capacitor Co; (1) the switching frequency is fixed, the ON duty of the transistor Qb is made small to store less energy in the inductance to thereby make small the discharge time of the energy to the capacitor Co, or (2) the switching frequency is changed and also the ON duty of the transistor Qb is made small. Such duty control or switching frequency control is carried out for a predetermined time period starting from the operation start mode, and thereafter the switching frequency and duty are stepwise or gradually shifted to those in the stationary mode.

In the above operation (1) or (2), an ON signal is issued to the transistor Qa during the OFF period of the transistor Qb, so that completion of the charging to the capacitor Co through the diode Da causes the transistor Qa to be turned ON to start discharging of the capacitor Co. Now the control operation (1) or (2) is carried out to operate only the transistor Qb to previously stop the transistor Qa. This enables the voltage across the capacitor Co to quickly rise and thus enables the charging time to the capacitor Co to be shortened to the same level as in the stationary mode. With this arrangement, there can be shorten a time taken to shift the operation start mode to the stationary mode.

Figure 24:
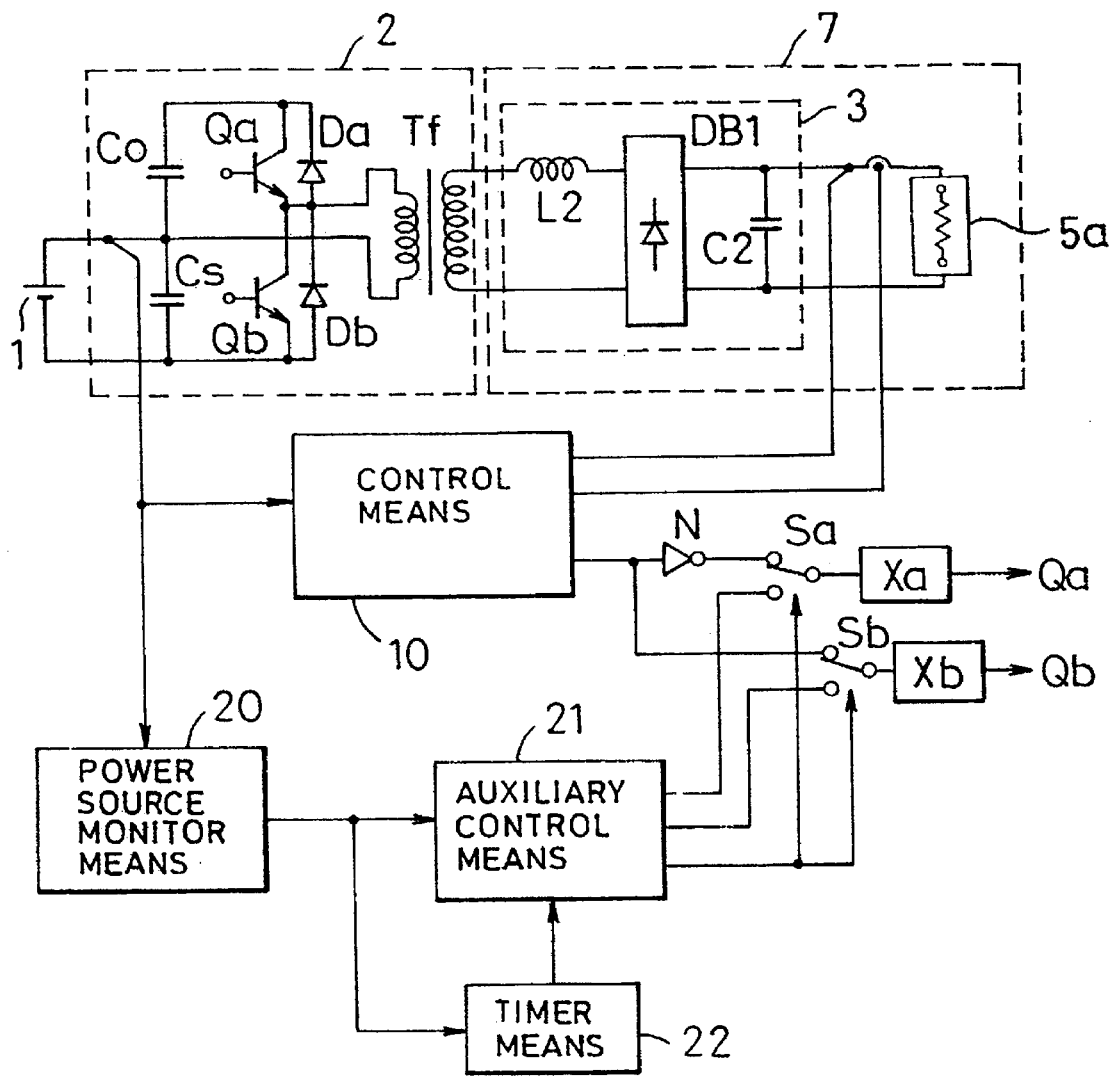
FIG. 24 is a circuit diagram of a tenth embodiment of the present invention.

In an embodiment 10 shown in FIG. 24 in accordance with the present invention, the transistors Qa and Qb in the high-frequency inverter means 2 are alternately turned ON and OFF to convert the voltage of the D.C. power source 1 into a high frequency voltage which is then boosted by the transformer Tf. Connected to the secondary winding of the transformer Tf is the load circuit 7. Immediately after the power source is turned ON, a power source monitor circuit 20 is operated to start a auxiliary control circuit 21. At this time, switches Sa and Sb are switched to apply output signals of the auxiliary control circuit 21 to drive circuits Xa and Xb respectively. The operational time of the auxiliary control circuit 21 is set by a timer circuit 22 receiving the output signal of the power source monitor circuit 20. When the set operational time expires, the switches Sa and Sb are switched to apply an output of the control circuit 10 to the drive circuits Xa and Xb. The auxiliary control circuit 21 is arranged to carry out the above duty control or switching frequency control of the above (1) or (2).

Figure 25:
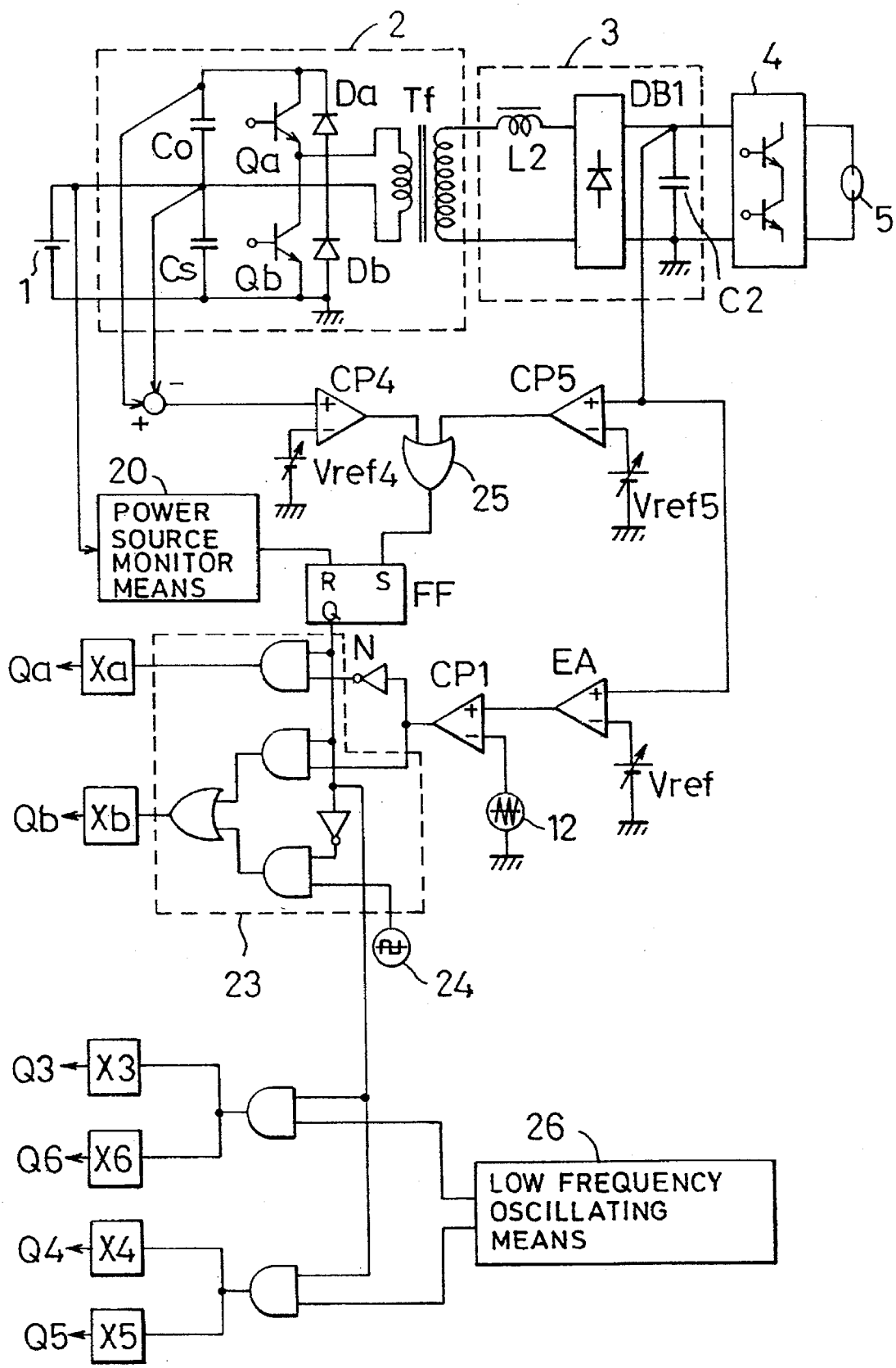
FIG. 25 is a circuit diagram of an eleventh embodiment of the present invention.

In an embodiment 11 of FIG. 25 in accordance with the present invention, the timer circuit 22 in the foregoing embodiment 10 is replaced by such an arrangement that auxiliary control is carried out in an operation start mode so that voltages across the capacitors Co and C2 are detected and compared at comparators CP4 and CP5 until the voltages become equal to set voltages Vref4 and Vref5. Immediately after the power source is turned ON, the power source monitor circuit 20 is operated to send a reset signal to an RS flip-flop FF and to set its Q output to have its low level. This causes a switch circuit 23 to be operated to stop the transistor Qa and the transistors Q3 to Q6 comprised of the rectangular-wave inverter means 4 in an output circuit. At the same time, an output of an oscillator 24 causes the transistor Qb to be operated. The oscillator 24 is set to provide such frequency and duty cycle as to be enough to charge the capacitor Co when the transistor Qb is turned OFF in the operation start mode. When the voltage across the capacitor Co or C2 exceeds a certain set value, the Q output of the RS flip-flop FF becomes high level so that the switch circuit 23 operates and the power supply apparatus is shifted to an ordinary control operational mode. Since this enables the stress imposed on the switching elements at the time of starting the power supply apparatus to be lightened, the element breakdown current can be reduced and the stress imposed on other parts can also be reduced. In this conjunction, the present embodiment further includes a logical OR circuit 25 and a low frequency oscillator 26.

Figure 26:
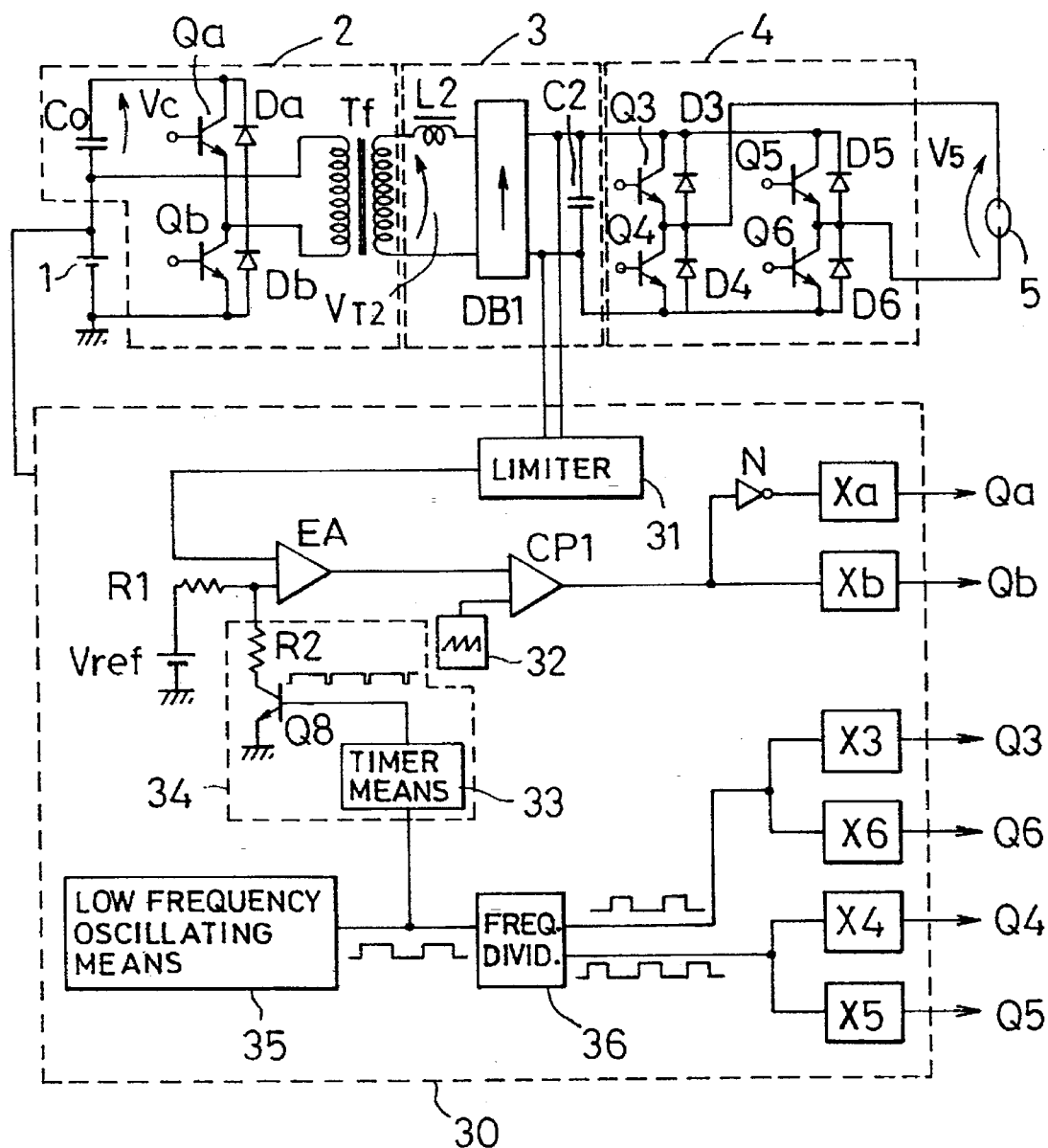
FIG. 26 is a circuit diagram of a twelfth embodiment of the present invention.

An embodiment 12 of FIG. 26 in accordance with the present invention includes a controller 30, a voltage detection circuit 31, a saw-tooth-wave oscillation circuit 32, a timer circuit 33, a refiring compensation circuit (reference voltage change circuit) 34, a low frequency oscillation circuit 35 and a frequency divider circuit 36. Also included in the present embodiment are drive circuits Xa, Xb and X3 to X5 for the transistors Qa, Qb and Q3 to Q5, an error amplifier EA, a comparator CP1, resistors R1 and R2 and a transistor Q8. Reference symbol Vref refers to a reference voltage. In this connection, the structures of the high-frequency inverter means 2, AC/DC converter 3 and rectangular-wave inverter means 4 are substantially the same as those in the foregoing embodiment 3; and the operation of a main circuit is also substantially the same as that in the foregoing embodiments.

In the present embodiment, there is provided a means for facilitating the refiring operation of a discharge lamp when the lamp is lighted on rectangular wave power. Explanation will be made as to the refiring operation. Use of the discharge lamp for a long time causes the lamp voltage to rise, which results in the fact that, in particular since the refiring voltage becomes high at the time of polarity inversion, extinction takes place. For the purpose of realizing stable lighting of the discharge lamp for a long period of time, such an arrangement is employed that the secondary voltage of the transformer is set high. However, this arrangement involves increase of the size of the transformer Tf and also involves increase of stress imposed on the primary winding by the correspondingly increased turn ratio. In the present embodiment, in order to realize the stable lighting of the lamp in the vicinity of refiring point of the lamp current at least when the polarity is inverted (which is one of the causes for the extinction) and also to suppress the extinction, a means is provided for temporarily apply a voltage higher than that in the stationary state thereto.

Figure 27:
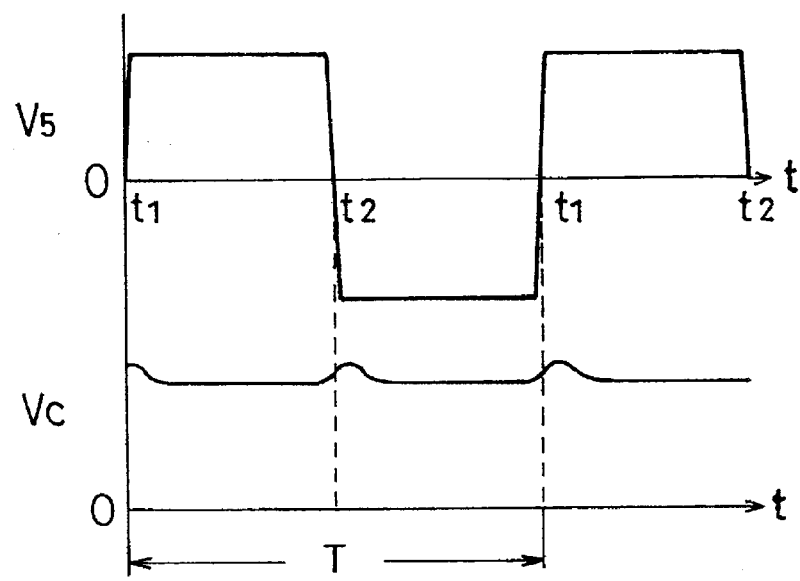
FIG. 27 shows waveforms of signals appearing in the twelfth embodiment of the present invention.

Shown in FIG. 27 are the lamp voltage V5 and voltage Vc across the capacitor Co in the present embodiment 12. In the controller 30, a detection voltage detected by the voltage detection circuit 31 is compared with the reference voltage Vref and amplified at the error amplifier EA, an output of which amplifier is compared with an output of the saw-tooth-wave oscillation circuit 32 at the comparator CP1 which generates a PWM signal variable in its ON time. The PWM signal is used to turn ON and OFF the transistors Qa and Qb at an oscillation frequency (of several ten to several hundred kHz) of the saw-tooth-wave oscillation circuit so that the ON time of the transistors Qa and Qb can be controlled according to the detection quantity of the voltage detection circuit 31. In a normal mode of the refiring compensation circuit 34, the transistor Q8 is turned ON and turned OFF only in the vicinity of polarity inverting time of the rectangular-wave lighting. This causes the reference voltage Vref applied to the error amplifier EA to rise and the output of the error amplifier EA to drop, with the result that the pulse width control signal (output of the comparator CP1) varies in such a direction as to broaden the ON time. This timing is carried out in synchronism with an output of the low frequency oscillation circuit 35, and the timer circuit 33 sets the ON time of the transistor Q8. The low frequency oscillation circuit 35 generates a rectangular wave, lighting frequency for driving the transistors Q3 to Q6. The output of the comparator CP1 determines the ON time of the transistor Qb and its inverted signal determines the ON time of the transistor Qa. When the ON time of the transistor Qb is prolonged, power supplied from the D.C. power source 1 is increased so that the boosting ability of the capacitor Co is enhanced at the time of turning OFF the transistor Qb, as shown in FIG. 27 (t1, t2, etc.). With the increased the voltage Vc, a secondary voltage V2 of the transformer Tf rises, which facilitates refiring of the discharge lamp in its rectangular-wave lighting mode, thus resulting in that the discharge lamp can be lighted stably without extinction. In other words, the discharge lamp can be lighted stably for a long period of time. Further, since the refiring compensation can be realized without increasing the turn ratio of the transformer Tf, the transformer Tf can be made small in size.

Although the temporary voltage rise has been given in the vicinity of the refiring time in the present embodiment, such an arrangement may be employed as necessary that, when the extinction tended to easily take place as when the power source voltage dropped or as when the lamp voltage is increasing in the stationary mode, the refiring compensation is carried out according to the detection of such tendency.

In accordance with the present embodiment, only by temporarily broadening the ON time of the transistor Qb, the extinction prevention can be achieved with ease of control. Though the control of the ON time has been carried out by changing the reference voltage Vref in the present embodiment, such an arrangement may be employed that the detection voltage value is temporarily divided or another circuit is added to preferentially control the circuit temporarily. That is, any arrangement may be used so long as it acts to controllably increase the voltage Vc across the capacitor Co.

Figure 28:
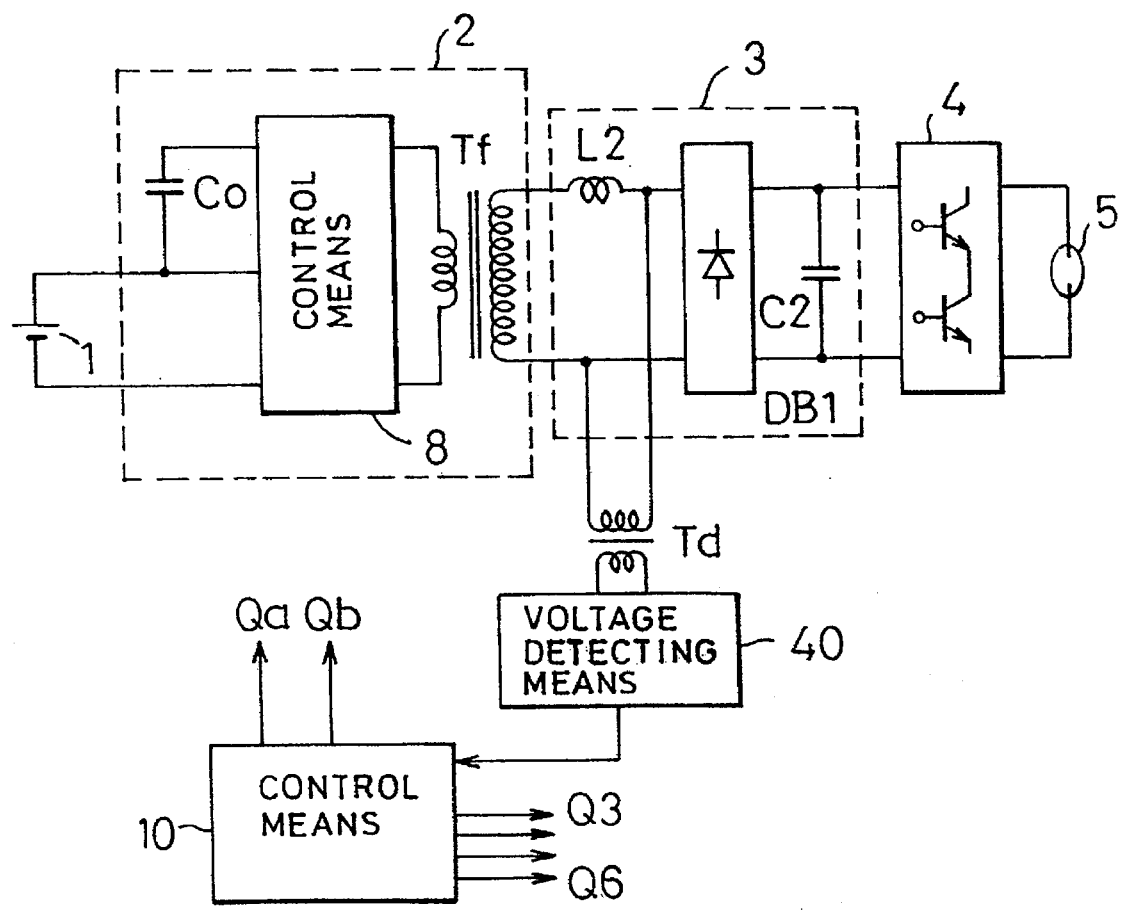
FIG. 28 is a circuit diagram of a thirteenth embodiment of the present invention.

In an embodiment 13 of the present invention shown in FIG. 28, a voltage detecting transformer Td is connected immediately upstream of input ends of the rectification circuit DB1 and the high-frequency inverter means 2 generates a high frequency output, whereby a compact detecting transformer Td can be realized. That is, in the method for detecting the output of the rectangular-wave inverter means 4 or the voltage across the capacitor C2, since the second inverter circuit 4 generates a low frequency output, this results in the transformer Tf must be made large in size; and since the voltage across the capacitor C2 is of a DC type, it tends to highly difficult to detect it by means of transformer. In the present embodiment, on the other hand, since the voltage detecting transformer Td is connected directly upstream the rectification circuit DB1, a detection output isolated by the small-sized transformer can be obtained. Connected to output ends of a secondary winding of the voltage detecting transformer Td is a voltage detection circuit 40 to obtain the D.C. detection output. In the case where the voltage of the capacitor C2 substantially equal to the output voltage is detected immediately upstream the rectification circuit DB1, diodes in the rectification circuit DB1 are conducted when the input voltage of the rectification circuit DB1 becomes equal to or higher than the voltage across the capacitor C2. At this time, the input voltage of the rectification circuit DB1 becomes equal to the voltage of the capacitor C2. When the capacitance of the capacitor C2 is large and the generated voltage contains less ripples, the voltage keeps substantially at the identical level that corresponds to a peak in the waveform during the conduction of the diodes of the rectification circuit DB1. The voltage detection circuit 40 finds a peak value in the waveform of the voltage detected by the voltage detecting transformer Td and generates an output voltage (i.e., the voltage of the capacitor C2). In the voltage detection circuit 40, a time constant of a filter circuit for smoothing its output voltage is set to be longer at least than the switching period of the transistors Qa and Qb. The voltage detected by the voltage detection circuit 40 is applied to the control circuit 10 for output control.

Figure 29:
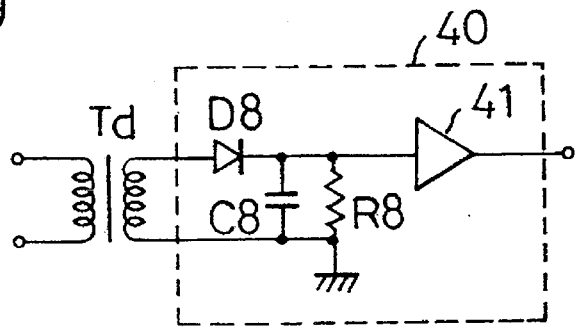
FIG. 29 is a circuit diagram of an example of a detection circuit used in the thirteenth embodiment of FIG. 28 of the present invention.
Figure 30:
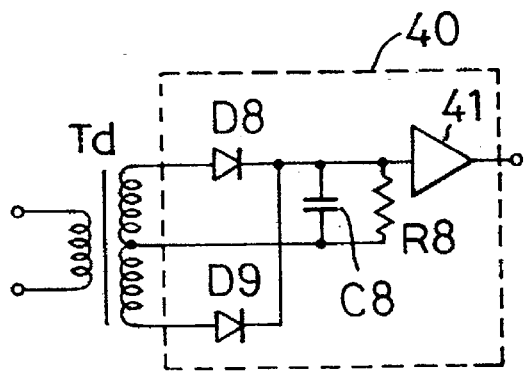
FIG. 30 is a circuit diagram of another example of the detection circuit used in the thirteenth embodiment of FIG. 28 of the present invention.

Shown in FIG. 29 is a detailed example of the voltage detection circuit 40. More specifically, an output of a secondary winding of the voltage detecting transformer Td is rectified by a diode D8 and then charged into a capacitor C8. A time constant determined by the capacitor C8 and a resistor R8 is set to be much larger than the switching frequency. This results in that a voltage across the capacitor C8 becomes substantially equal to a peak voltage of the voltage detection circuit 40 and then output through an amplifier 41. The voltage detection circuit 40 may be of a full-wave rectification type which uses two diodes D8 and D9, as shown in FIG. 30.

Figure 31:
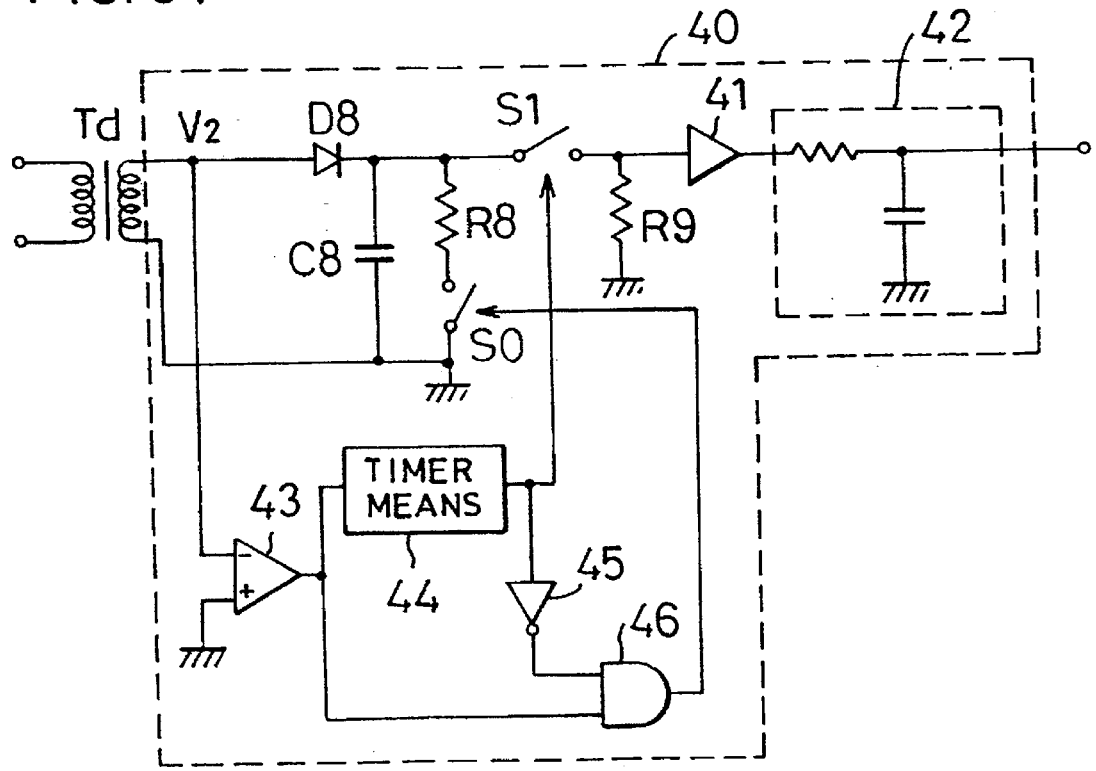
FIG. 31 is a circuit diagram of a fourteenth embodiment of the present invention.
Figure 32:
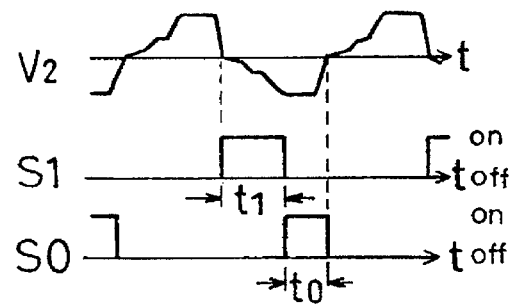
FIG. 32 shows waveforms of signals appearing in the fourteenth embodiment of FIG. 31 of the present invention.

An embodiment 14 of the present invention shown in FIG. 31 is arranged to have a more improved detection response characteristic of the voltage detection circuit 40 of FIG. 28 and to be suitable for accurater control. In this case, the secondary output voltage V2 of the voltage detecting transformer Td is charged into the capacitor C8 during its half cycle. During the next half cycle the capacitor C8 is not charged with the voltage V2 due to the presence of the diode D8. Within a set time interval t1 of the half cycle during which the capacitor C8 is not charged, a switch S1 is in its ON state so that the detection voltage is output through the amplifier 41 and a filter circuit 42. Within a remaining time interval t0 of the half cycle during which the capacitor C8 is not charged, a switch S0 is in its ON state to discharge charges out of the capacitor C8. This results in that the capacitor C8 is charged with each cycle of peak voltage and also becomes less influenced by its waveform. Further, a response characteristic caused by a drop of the voltage is much improved over that of, e.g., the embodiment 13. Shown in FIG. 32 are waveforms of the secondary voltage V2 of the voltage detecting transformer Td and of signals of the switches S0 and S1. Though the detection waveform voltage is compared at a comparator 43 and then passed through a timer circuit 44, a logical inversion circuit 48 and a logical AND circuit 46 to obtain the operational signals of the switches S0 and S1 in the embodiment circuit of FIG. 31, such an arrangement may be employed that the output signal of the comparator 43 is replaced by a drive signal for a high frequency switching element 8.

Figure 33:
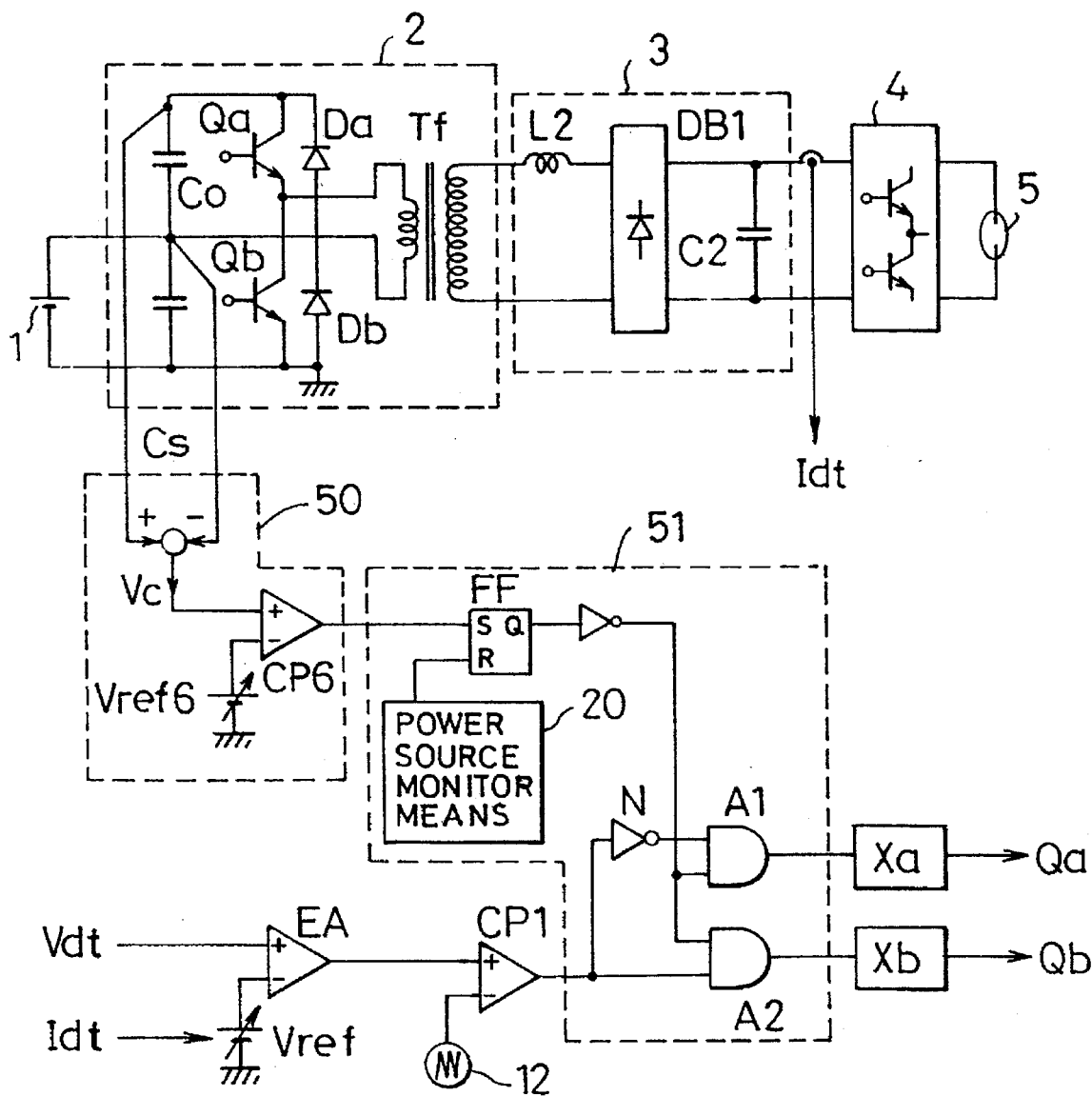
FIG. 33 is a circuit diagram of a fifteenth embodiment of the present invention.

An embodiment 15 of the present invention is shown in FIG. 33. Since the voltage across the capacitor Co fluctuates with the duty ratio of the transistors Qa and Qb in the inverter circuit, the voltage across the capacitor Co may sometimes be higher than the power source voltage depending on the duty ratio. When the voltage of the capacitor Co becomes too high, it exceeds the breakdown voltages of the transistors Qa and Qb and the breakdown voltage of the secondary winding of the transformer Tf, which leads to one of the fault causes. To avoid this, in the present embodiment, the voltage of the capacitor Co is detected by a voltage detection circuit 50 so that, when the detected voltage becomes equal to or higher than a set voltage, a comparator CP6 operates to drive an abnormal voltage prevention circuit 51, whereby the drive signals of the transistors Qa and Qb are inhibited to stop the operation of the transistors Qa and Qb. In the drawing, reference symbols Idt and Vdt denote detected values of the output current and voltage respectively.

Figure 34:
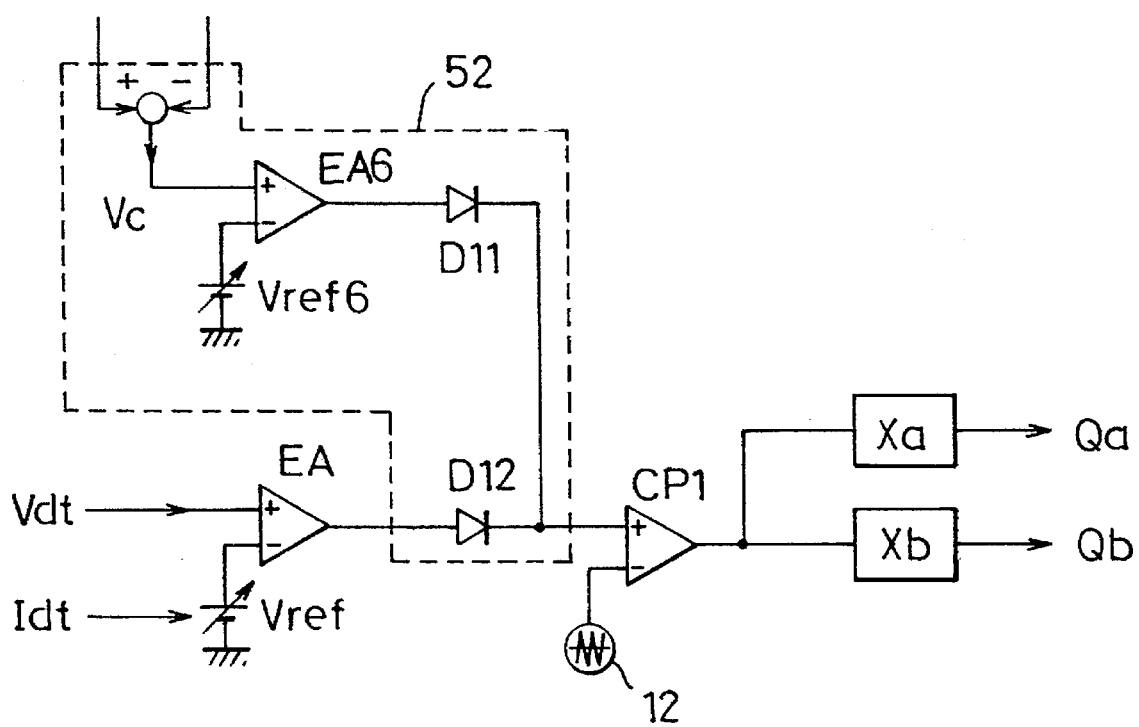
FIG. 34 is a circuit diagram of a sixteenth embodiment of the present invention.

In an embodiment 16 of the present invention shown in FIG. 34, for the purpose of preventing an excess voltage from appearing across the capacitor Co when the duty ratio of the transistor Qb is too high, larger one of the output of the error amplifier EA for normal output control and the output of the error amplifier EA6 for monitoring of the voltage across the capacitor Co is selected through diodes D11 and D12 and then applied to the comparator CP1 to generate a switching signal, whereby the voltage across the capacitor Co is controlled not to exceed a set value. In this conjunction, the similar control to the above embodiments can be realized by detecting the voltages across the capacitors Co and Cs. This is because the voltage of the D.C. power source 1 is equal to the voltage across the capacitor Cs and stable so that the voltage cross the capacitor Co can be detected as a voltage across a series circuit of the capacitors Co and Cs.

Figure 35:
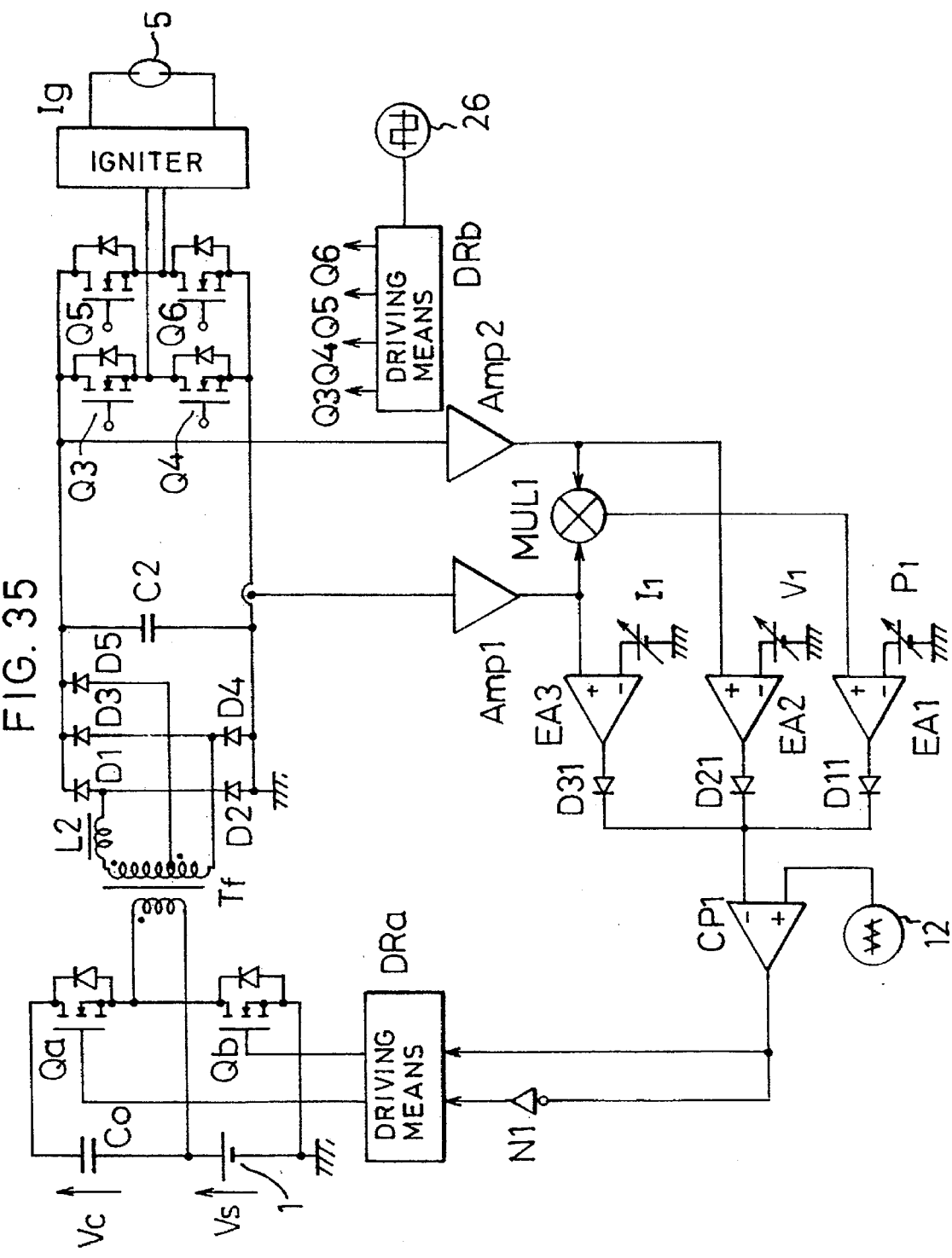
FIG. 35 is a circuit diagram of a seventeenth embodiment of the present invention.

An embodiment 17 of the present invention shown in FIG. 35, which is a more detailed example of the embodiment of FIG. 11, is arranged to controllably light a discharge lamp load with a predetermined quantity of power. The present embodiment includes a drive circuit DRb for driving switching elements Q3 to Q6, a drive circuit DRa for driving the switching elements Qa and Qb, an amplifier Amp1 for amplifying a detected current flowing into an inverter circuit of the switching elements Q3 to Q6, an amplifier Amp2 for amplifying a detected voltage to be applied to the inverter circuit of the switching elements Q3 to Q6, a multiplier MUL1 for multiplying outputs of the amplifiers Amp1 and Amp2, an error amplifier EA1 for comparing an output of the multiplier MUL1 with a power command P1, an error amplifier EA2 for comparing an output of the amplifier Amp2 with a limited maximum voltage value V1, an error amplifier EA3 for comparing the output of the amplifier Amp1 with a limited maximum current value I1, a comparator CP1 for comparing maximum one of outputs of the error amplifiers EA1 to EA3 through diodes D11, D21 and D31 with an output of a high frequency triangular-wave generator 12 and for issuing an output to the drive circuit DRa, and a low frequency oscillator 26 for sending a control signal to the switching elements Q3 to Q6 through the drive circuit DRb.

The operation of the present embodiment will next be briefly explained. In a stationary mode, the output of the error amplifier EA1 is used to control the switching elements Qa and Qb and power supplied to a discharge lamp 5 is controlled to be substantially constant for stable lighting of the discharge lamp 5. In a low impedance mode as immediately after the discharge lamp 5 was lighted, the output of the error amplifier EA3 is used to control the switching elements Qa and Qb in such a manner that a lamp current becomes below a maximum rated current. In an OFF mode in which the discharge lamp 5 is in its OFF state, the output of the error amplifier EA2 is used to control the switching elements Qa and Qb in such a manner that the voltage applied to the discharge lamp 5 is higher, e.g., by 300 V than that in the ON mode to start the discharge lamp 5.

However, the embodiment 17 of FIG. 35 has a danger that there may occur a problem which follows.

That is, if it is assumed that the switching elements Qa and Qb have their ON times Ta and Tb and have a period T respectively, then there is satisfied a relationship between an ON duty Duty B (=Tb/T) of the switching element Qb and output power of the present embodiment circuit of FIG. 35.

Figure 36:
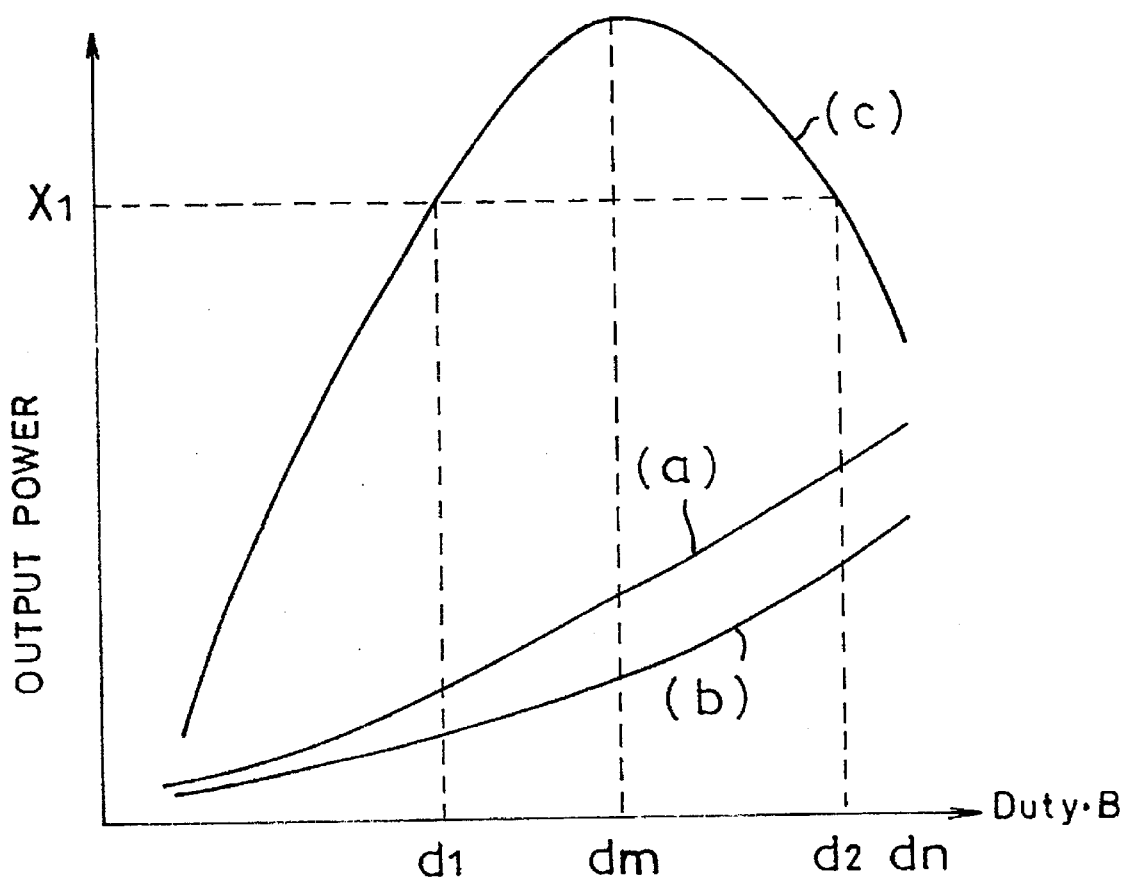
FIG. 36 is a graph for explaining the operation of the seventeenth embodiment of FIG. 35 of the present invention.
Figure 37:
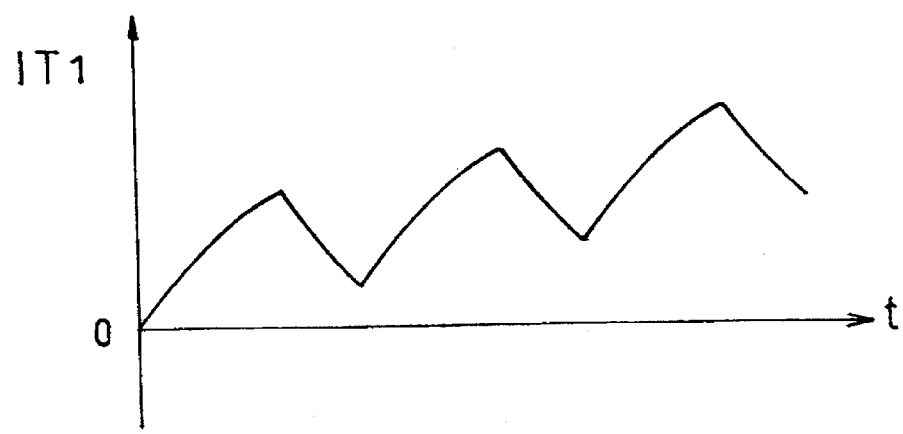
FIG. 37 shows a partial waveform of a signal appearing in the seventeenth embodiment of FIG. 35 of the present invention.

In the stationary ON mode of the discharge lamp 5 or when the load has an impedance substantially equal to the lamp impedance in the stationary ON mode, the output power increases with increased ON duty Duty B of the switching element Qb, as shown in FIG. 36, (a). Further, when the lamp impedance (or load impedance) rises by a small amount when compared with that in the above case, the output power drops as a whole, as shown in FIG. 36, (b). In a low impedance mode in which the lamp impedance (or load impedance) is low as immediately after the discharge lamp 5 was lighted, when it is desired to obtain an output mainly from the intermediate tap provided in the secondary winding n2 of the transformer Tf, the output power varies substantially along a parabolic line as the ON duty Duty B of the switching element Qb increases, as shown in FIG. 36, (c). When the ON duty Duty B of the switching element Qb is below dm, the output power increases with the increased the ON duty Duty B of the switching element Qb. When the ON duty Duty B of the switching element Qb exceeds dm, on the other hand, a primary current $I_{T1}$ flowing through the primary winding of the transformer Tf becomes always higher than zero as shown in FIG. 37 so that the primary current $I_{T1}$ becomes excessive and saturated. This results in that the output power decreases as the ON duty Duty B of the switching element Qb is increased as shown in FIG. 36, (c). In this way, the output power characteristic greatly varies depending on the value of the lamp impedance (or load impedance).

For example, when the mode was abruptly shifted from a mode in which the switching elements Qa and Qb were operated with the ON duty Duty B of the switching element Qb being equal to dn and a voltage (e.g., 300 V) of the discharge lamp 5 in its OFF state was applied thereto to a low lamp-impedance mode in which the discharge lamp 5 was in its ON state with a low lamp impedance; the operation of the switching elements Qa and Qb with the ON duty Duty B=dn of the switching element Qb causes the excess primary current IT1 to flow through the primary winding of the transformer Tf and to be saturated, so that there may occur a possibility that excessive stress is imposed on the switching elements and so on.

Figure 38:
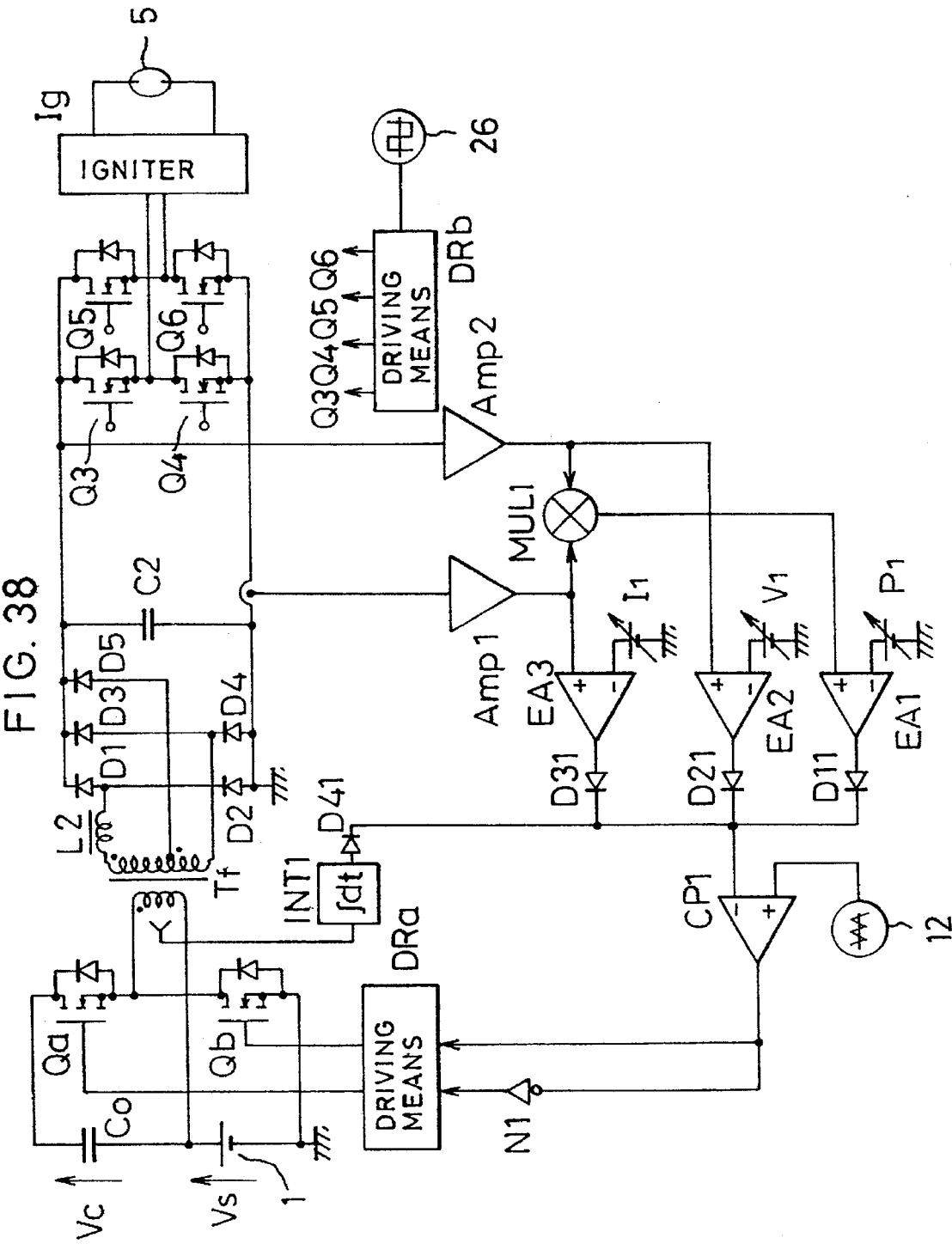
FIG. 38 is a circuit diagram of an eighteenth embodiment of the present invention.

To avoid this, such an embodiment 18 as shown in FIG. 38 is arranged to provide an integrator INT1 for detecting and integrating a primary output voltage of the transformer Tf and then applying it to a negative input terminal of the comparator CP1 through a diode D41. Other arrangement is substantially the same as that of FIG. 35 with substantially the same effects.

The present embodiment is arranged to utilize the fact that, when such an excess primary current IT1 as shown in FIG. 37 flows through the primary winding of the transformer Tf and is saturated, the integrated value of the primary voltage applied to the primary winding of the transformer Tf is not zero,. That is, when the integrator INT1 detects the primary voltage of the transformer Tf, integrates it and finds it not to be zero; the integrator judges that the primary current IT1 is changed to such a direction that the primary current IT1 is saturated, and controls so as to decrease the ON duty of the switching element Qb, that is, to suppress the output power to the discharge lamp 5.

Shown in FIGS. 39 to 43 are different detailed examples of the integrator INT1 usable in the embodiment of FIG. 38.

Figure 39:
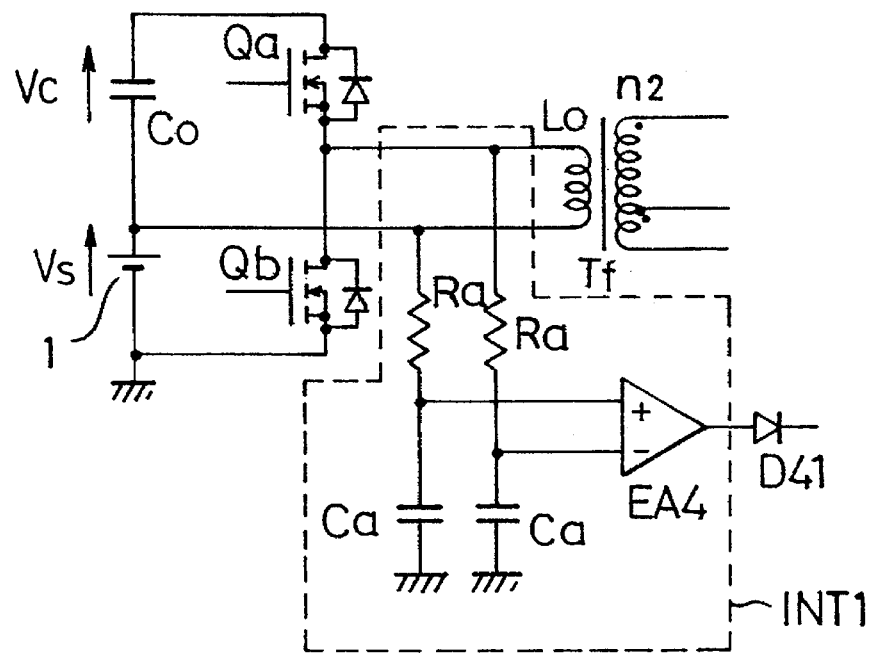
FIG. 39 is a specific circuit diagram of an example of an integrator used in the eighteenth embodiment of FIG. 38 of the present invention.
Figure 40:
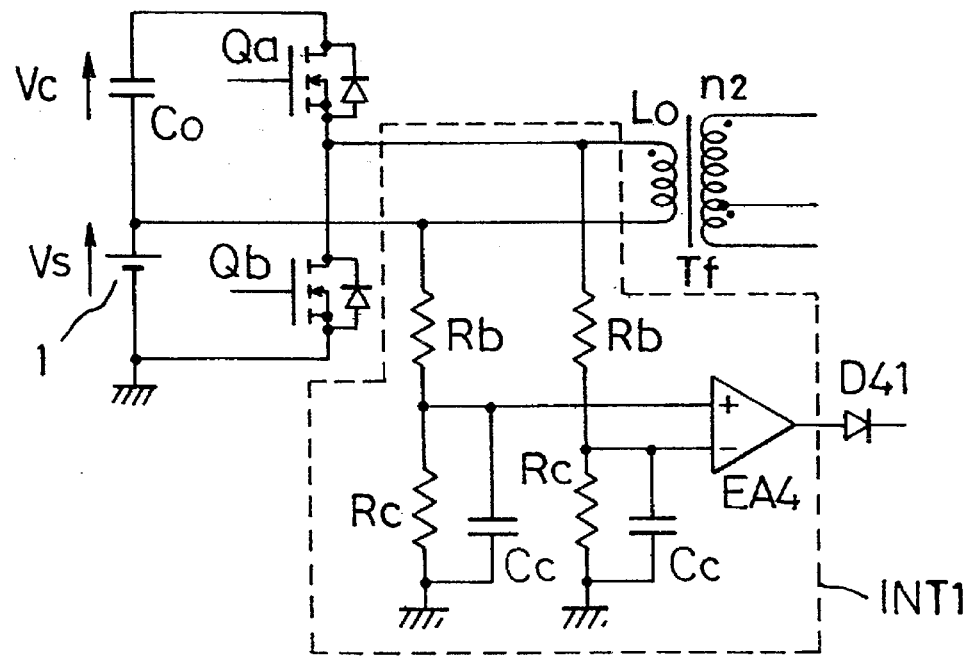
FIG. 40 is a specific circuit diagram of another example of the integrator used in the eighteenth embodiment of FIG. 38 of the present invention.

In such a circuit as shown in FIG. 39, the primary voltage of the transformer Tf is applied between positive and negative input terminals of an error amplifier EA4 through a filter circuit of a resistor Ra and a capacitor Ca so that an output of the error amplifier EA4 is used as an output of the integrator INT1. In this case, a time constant determined by the resistor Ra and capacitor Ca is set to be sufficiently larger than the switching frequency of the switching elements Qa and Qb. In a normal operational mode, voltages on the positive and negative input terminals of the error amplifier EA4 become nearly equal to each other so that the output of the error amplifier EA4 becomes zero. When the saturated primary current IT1 flows through the primary winding Lo of the transformer Tf, the voltage on the negative input terminal of the error amplifier EA is lower than that of the positive input terminal thereof so that the error amplifier EA outputs a high level of output signal, on the basis of which signal it is judged that the primary current is being saturated. In this connection, the above input arrangement to the positive and negative input terminals of the error amplifier EA4 may be replaced by such an arrangement of voltage division by the resistors Rb and Rc and a capacitor Cc as shown in FIG. 40.

Figure 41:
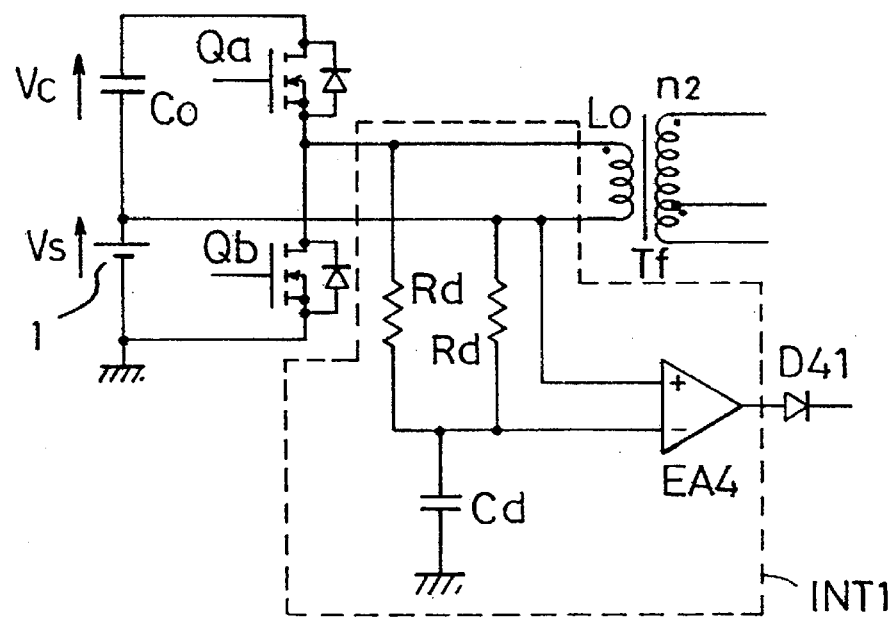
FIG. 41 is a specific circuit diagram of a further example of the integrator used in the eighteenth embodiment of FIG. 38 of the present invention.

In such a circuit as shown in FIG. 41, a voltage across the primary winding Lo of the transformer Tf is divided by two resistors Rd a middle voltage appearing at a junction point of the two resistors Rd is filtered by a capacitor Cd and then applied to a negative input terminal of the error amplifier EA4 to which positive input terminal the voltage of the D.C. power source Vs is also applied.

Figure 42:
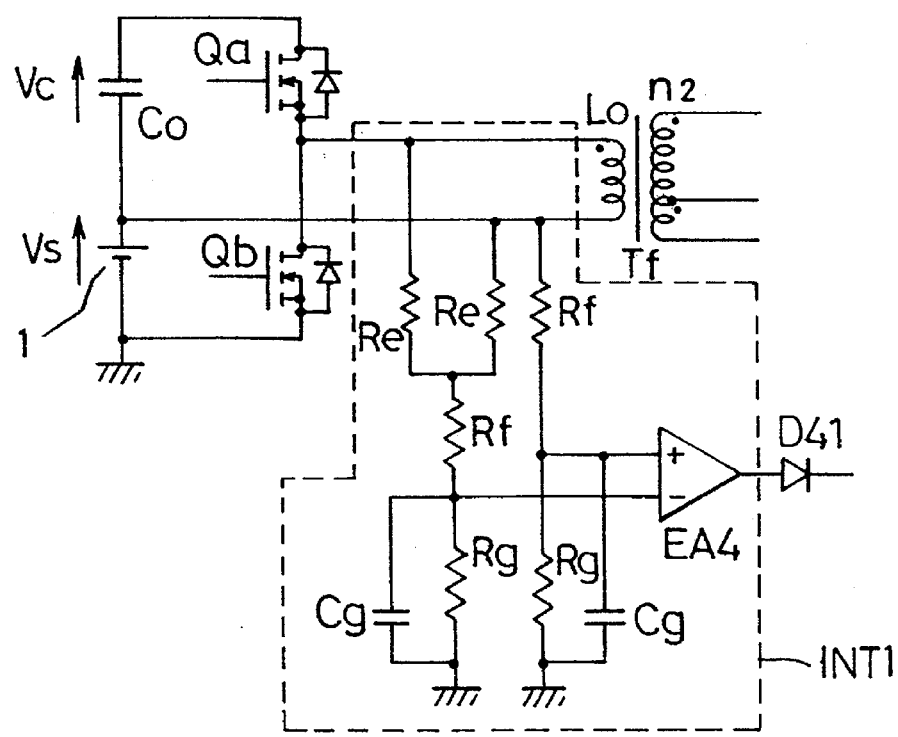
FIG. 42 is a specific circuit diagram of yet another example of the integrator used in the eighteenth embodiment of FIG. 38 of the present invention.

In a normal operational mode, the voltage across the capacitor Cd becomes nearly equal to the D.C. power source voltage Vs so that the output of the error amplifier EA4 voltage Vs becomes zero. Meanwhile, when the saturated primary current IT1 flowing through the primary winding Lo of the transformer Tf, the voltage on the negative input terminal of the error amplifier EA4 becomes lower than the voltage on the positive input terminal of the error amplifier EA4 so that the error amplifier EA4 generates a high level of signal and it can be judged on the basis of the signal that the primary current IT1 is being saturated. In this connection, the above input arrangement to the negative input terminal of the error amplifier EA4 may be replaced by such an input arrangement of voltage division by resistors Re, Rf and Rg, and a capacitor Cg and the above input arrangement to the positive input terminal of the error amplifier EA4 may be replaced by such an input arrangement of voltage division by the resistors Rf and Rg, and capacitor Cg as shown in FIG. 42.

Figure 43:
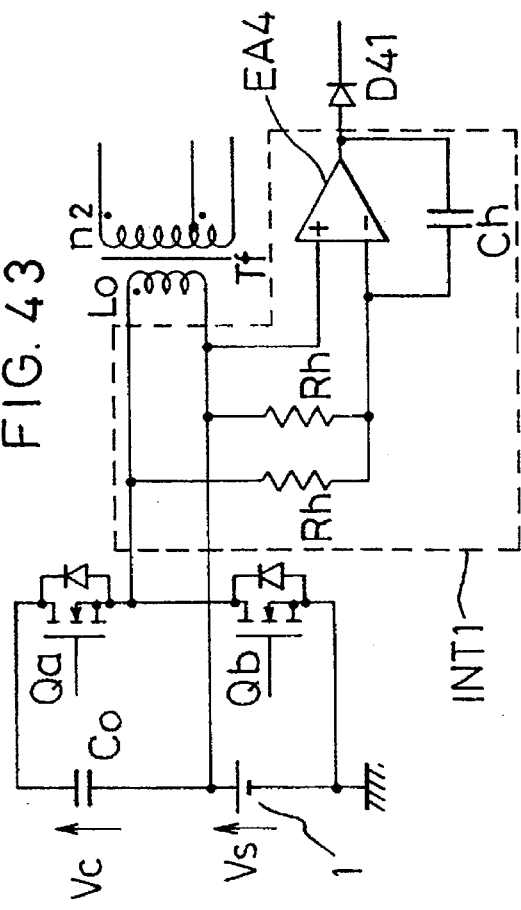
FIG. 43 is a specific circuit diagram of yet a further example of the integrator used in the eighteenth embodiment of FIG. 38 of the present invention.

In such a circuit as shown in FIG. 43, a resistor Rh, a capacitor Ch and the error amplifier EA4 are arranged to have an integration circuit configuration.

In the above examples, the integrator INT1 may be replaced by an averaging circuit for averaging the primary voltage of the transformer Tf or by a filtering circuit having a cut-off frequency lower than the operational frequency of the switching elements Qa and Qb for filtering the primary voltage of the transformer Tf.

Figure 44:
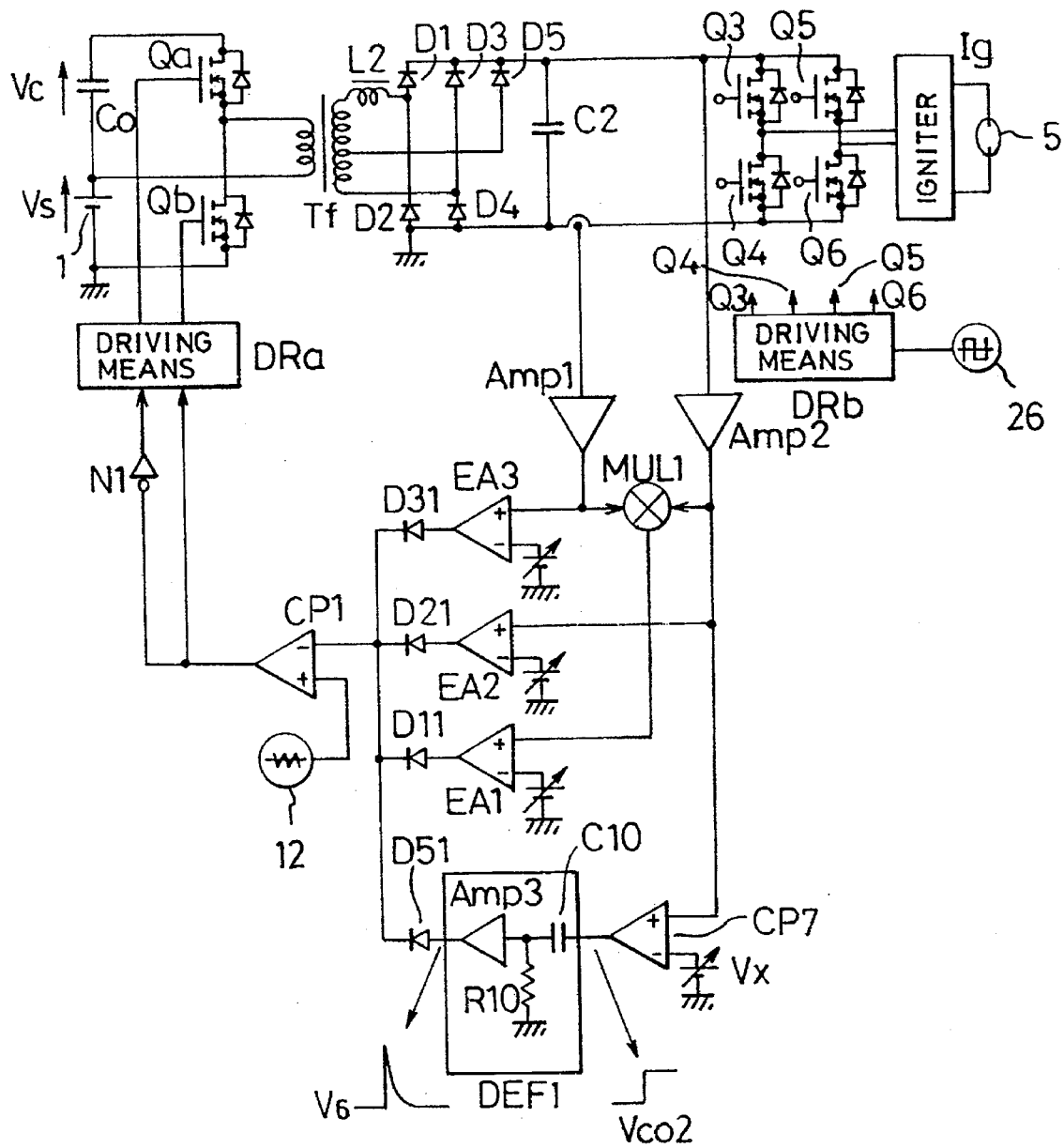
FIG. 44 is a circuit diagram of a nineteenth embodiment of the present invention.

In an embodiment 19 of the present invention shown in FIG. 44, a differentiating circuit DEF1 is provided for comparing he output of the amplifier Amp2 with the reference voltage Vx at the comparator CP7 to obtain a signal Vco2 and for differentiating the signal Vco2 to obtain a voltage V6 and for applying it to a negative input terminal of the comparator CP1 through a diode DS1. Other arrangement is substantially the same as that of FIG. 35, producing substantially the same operation.

In the present embodiment, the comparator CP7 judges the moment the discharge lamp 5 was lighted and controls to cause an output voltage Vco2 of the comparator CP7 changing from its low level to high to be applied to the differentiating circuit DEF1. In response to the reception of the output voltage Vco2, the differentiating circuit DEF1 outputs a pulsative voltage V6 and sends it to the comparator CP1, which results in that the power to be supplied to the discharge lamp 5 is reduced.

With such an arrangement, as soon as the discharge lamp 5 is lighted, the operation is forcibly changed to temporarily reduce the power to be supplied to the discharge lamp 5, that is, to make small the ON duty of the switching element Qb, thus preventing the saturation of the primary current IT1. The then output power is reduced to such a low level that the extinction of the discharge lamp 5 will not take place.

Figure 45:
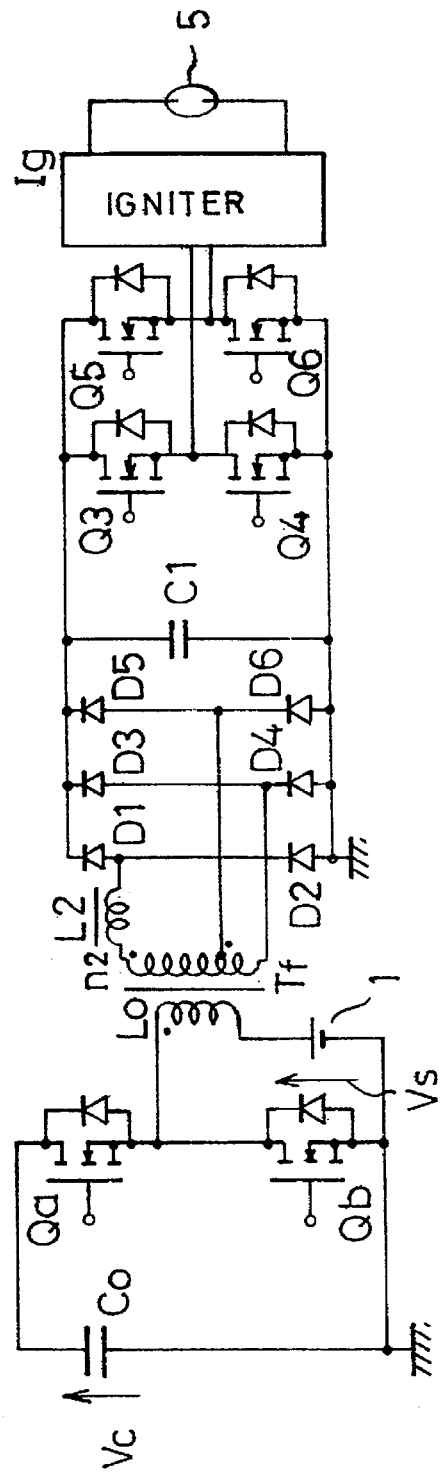
FIG. 45 is a circuit diagram of another form of the eighteenth embodiment of FIG. 38 and the nineteenth embodiment of FIG. 44 of the present invention.

Though the switching elements Q comprise FETs in all the foregoing embodiments, but they may be other type switching elements such as, e.g., ordinary transistors. Further, the inverter circuit connected to the primary winding side of the transformer Tf and including the switching elements Qa and Qb may be replaced with such an structure, e.g., as shown in FIG. 45. In the latter case, the capacitor Co is connected between both ends of a series connection of the switching elements Qa and Qb, and a series connection of the D.C. power source 1 and the primary winding Lo of the transformer Tf is connected across the switching element Qb.

Figure 46:
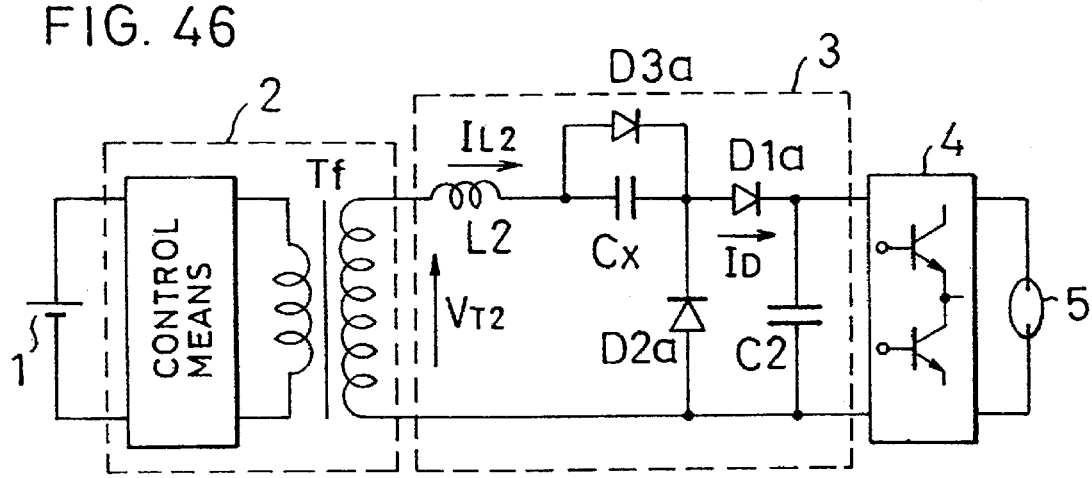
FIG. 46 is a circuit diagram of a twentieth embodiment of the present invention.

An embodiment 20 of the present invention shown in FIG. 46 shows another example of the rectification circuit provided on the secondary winding of the transformer Tf. In this case, when a voltage VT2 is negative, the capacitor Cx is charged; whereas, when the voltage $V_{T2}$ becomes positive, charges in the capacitor Cx are moved to the capacitor C2 through a route of the inductor L2, capacitor Cx, diode D1a and capacitor C2 to perform double voltage rectification circuit operation. Meanwhile, when the capacitor Cx is discharged and a voltage thereacross becomes zero, a diode Da3 is conducted so that the capacitor Cx is clamped and a current flows through a route of the secondary winding of the transformer Tf, inductor L2, diode D3a, diode D1a and capacitor C2, with the result that the secondary current of the transformer Tf is supplied directly to the load side. In this case, the capacitance of the capacitor Cx is set to be a predetermined value that is smaller than the capacitor C2.

Figure 47:
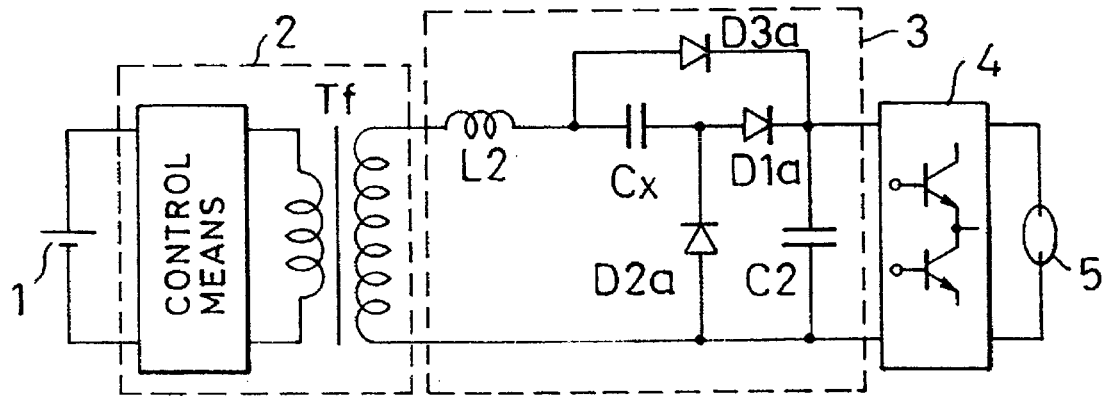
FIG. 47 is a circuit diagram of another form of the twentieth embodiment of FIG. 46 of the present invention.
Figure 48:
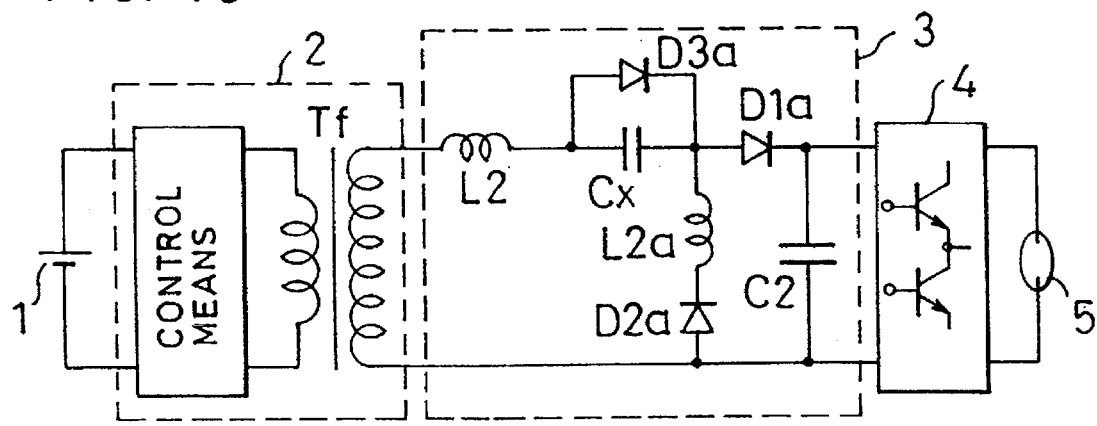
FIG. 48 is a circuit diagram of a further form of the twentieth embodiment of FIG. 46 of the present invention.
Figure 49:
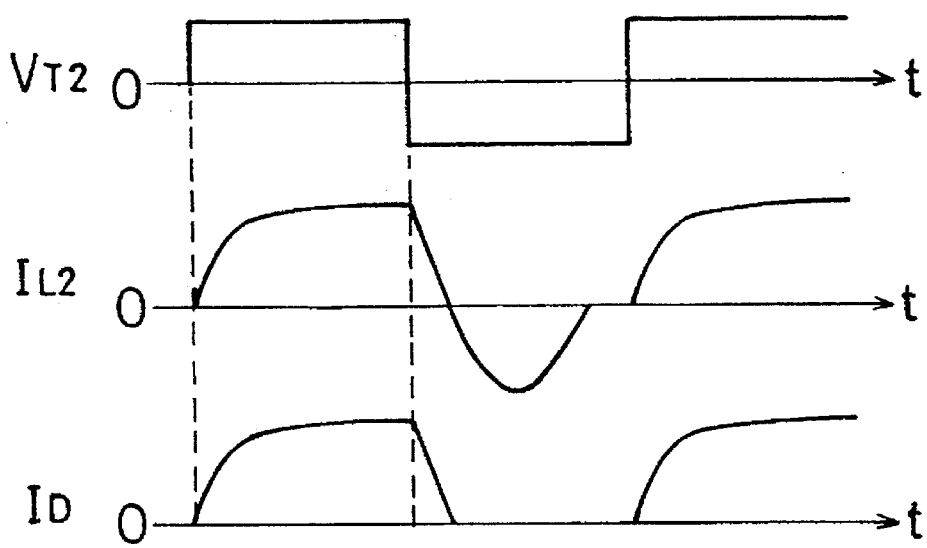
FIG. 49 shows waveforms of signals appearing in the twentieth embodiment of FIG. 46 of the present invention.

FIG. 49 shows waveforms of a voltage and current appearing in the secondary winding of the transformer Tf in the foregoing embodiment 20. It will be appreciated that a current ID supplied to the smoothing capacitor C2 has a trapezoidal waveform and thus the current peak can be reduced and the loss of the rectification circuit can be effectively reduced the position of the capacitor Cx to the clamp diode D3a in the embodiment 20 of FIG. 46 may be changed as shown in FIG. 47, and another current limiting element (such as an illustrated inductor L2a) may be provided in a path through which a current flows only at the time of charging the capacitor Cx as shown in FIG. 48.

What is claimed is:

1. A power supply apparatus comprising:

a series circuit of first and second switching elements each of which permit reverse-directional current flow, said first and second switching elements being alternately turned ON and OFF;

a series circuit of a D.C. power source and a load circuit including an inductance element connected between both ends of said first switching element;

a boosting capacitor connected between both ends of said second switching element at least through said load circuit; and control means for controlling a switching frequency of the first and second switching elements to be higher than a resonance frequency of said boosting capacitor and inductance element and for controlling a voltage across the boosting capacitor to render a voltage across said series circuit of the first and second switching elements to be higher than a voltage of said D.C. power source, wherein energy is stored into said load circuit from the D.C. power source through said first switching element, said energy being stored into the boosting capacitor through said second switching element, and energy in the boosting capacitor being supplied to the load circuit through the second switching element.

2. A power supply apparatus comprising:

a series circuit of first and second switching elements which permit reverse-directional current flow and which can be alternately turned ON and OFF;

a series circuit of a D.C. power source and a load circuit including an inductance element connected between both ends of said first switching element;

a boosting capacitor connected between both ends of said series circuit of the first and second switching elements; and control means for controlling a switching frequency of the first and second switching elements to be higher than a resonance frequency of said boosting capacitor and inductance element and for controlling a voltage across the boosting capacitor to render a voltage across said series circuit of the first and second switching elements to be higher than a voltage of said D.C. power source, wherein energy is stored into said load circuit from the D.C. power source through said first switching element, said energy being stored into the boosting capacitor through said second switching element and the D.C. power source in an additive polarity direction, and the energy in the boosting capacitor being supplied to the load circuit through the second switching element and the D.C. power source in a subtractive polarity direction.

3. A power supply apparatus comprising:

a series circuit of first and second switching elements which permit the flow of reverse-directional currents;

a series circuit of a boosting capacitor and a D.C. power source connected in parallel to said series circuit of the first and second switching elements;

a load circuit including an inductance element connected between a junction point of said D.C. power source and capacitor and a junction point of said first and second switching elements; and control means for controlling a switching frequency of the first and second switching elements to be higher than a resonance frequency of said boosting capacitor and inductance element and for controlling a voltage across the boosting capacitor to render a voltage across said series circuit of the first and second switching elements to be higher than a voltage of said D.C. power source.

4. A power supply apparatus as set forth in claim 1, wherein said load circuit is of a transformer coupling type.

5. A power supply apparatus as set forth in claim 4, wherein said switching frequency in a normal mode is set to be 1.5 times or more said resonance frequency of the capacitor and an inductance of a transformer when said load circuit is short-circuited at its output side.

6. A power supply apparatus as set forth in claim 4, wherein an LC series resonance circuit is provided to a secondary winding side of a transformer, and said switching frequency in a no load mode is set to be slightly higher than said resonance frequency of said LC series resonance circuit.

7. A power supply apparatus as set forth in claim 4, wherein an ON time of one of said switching elements is set to be shorter than an ON time of the other switching element.

8. A power supply apparatus as set forth in claim 4, further comprising means for controlling duties of said switching elements to cause an output voltage to become a predetermined value at the switching frequency in a no load mode.

9. A power supply apparatus as set forth in claim 4, wherein an ON time of one of said switching elements is set to be longer than an ON time of the other switching element, and the switching element having the longer ON time, when turned ON, forms a closed circuit with the D.C. power source and the primary winding of the transformer.

10. A power supply apparatus as set forth in claim 4, wherein, during OFF duration of one of said switching elements, the other switching element is turned ON a plurality of times.

11. A power supply apparatus as set forth in claim 4, wherein an auxiliary control circuit is provided for setting the OFF time of the switching element forming said closed circuit with the D.C. power source and the primary winding of the transformer to be longer only for a predetermined time duration immediately after said apparatus is started.

12. A power supply apparatus as set forth in claim 4, wherein said auxiliary control circuit shortens the ON time of the switching element forming the closed circuit with the D.C. power source and the transformer for the predetermined time duration immediately after said apparatus is started.

13. A power supply apparatus as set forth in claim 4, wherein said auxiliary control circuit stops the other switching element during the predetermined time duration immediately after said apparatus is started.

14. A power supply apparatus as set forth in claim 4, wherein said load circuit is selected from the group of an inverter circuit for converting a D.C. voltage of rectifying/smoothing circuit obtained by rectifying and smoothing an output of the secondary winding of the transformer into an A.C. rectangular-wave voltage and applying it to a load, a circuit for supplying the output of the secondary winding of the transformer to said load through a current limiting element as high frequency power, and a circuit for rectifying and smoothing the output of the secondary winding of the transformer into D.C. power and supplying the D.C. power to said load.

15. A power supply apparatus as set forth in claim 4, wherein said load circuit is made up of a circuit for rectifying and smoothing a voltage of the secondary winding of the transformer into a D.C. voltage, an inverter circuit for converting said D.C. voltage into a rectangular wave voltage of a low frequency, and a load driven by an output of said inverter circuit.

16. A power supply apparatus as set forth in claim 4, wherein said load circuit is made up of a circuit for rectifying and smoothing a voltage of the secondary winding of the transformer into a D.C. voltage, an inverter circuit for converting said D.C. voltage into a rectangular wave voltage of a low frequency, and a discharge lamp driven by an output of said inverter circuit, and further comprising refiring compensation means for setting the ON time of the switching element forming the closed circuit with the D.C. power source and the primary winding of the transformer to be temporarily longer.

17. A power supply apparatus as set forth in claim 4, wherein said refiring compensation means is operated when polarity of the rectangular wave applied to the discharge lamp is inverted.

18. A power supply apparatus as set forth in claim 4, wherein said load circuit has a rectification circuit for rectifying the voltage of the secondary winding of the transformer and a smoothing capacitor for smoothing an output of said rectification circuit, said rectification circuit is connected across its both input terminals with a voltage detecting transformer, and said voltage detecting transformer is connected at its output with a peak value detection circuit.

19. A power supply apparatus as set forth in claim 4, further comprising a voltage detection circuit for detecting a voltage across the capacitor and an abnormal voltage control circuit for controllably setting the ON time of the switching element to be shorter when said detected voltage across the capacitor becomes equal to or higher than a predetermined value.

20. A power supply apparatus as set forth in claim 4, wherein said load is a discharge lamp.

21. A power supply apparatus comprising:
a pair of switching elements connected in series and capable of being alternately turned ON and OFF;
a transformer having a primary winding which primary winding includes a first and a second tap, a first series circuit including said second tap and a D.C. power source being connected between both ends of one of the switching elements;
a capacitor connected between both ends of a second series circuit including both of said switching elements; and
a diode inserted in its forward direction from said power source inserted between the other end of the primary winding of the transformer with respect to the tap and said capacitor toward the capacitor,
wherein power is supplied to a load circuit connected to a secondary winding of the transformer.

22. A power supply apparatus as set forth in claim 4, wherein the secondary winding of the transformer is provided with an intermediate tap.

23. A power supply apparatus as set forth in claim 22, wherein an inductor is connected in series with a high voltage secondary winding of the transformer to be connected to a load through a rectification circuit, and said intermediate tap is connected to the load through the diode.

24. A power supply apparatus comprising:
a pair of bidirectional switching elements connected in series and capable of being alternately turned ON and OFF;
a transformer having a primary and a secondary winding which secondary winding has an intermediate tap and which primary winding is connected between a series circuit of a D.C. power source and one of said switching elements;
a capacitor connected between both ends of the series circuit of said switching elements; and
a load circuit connected between both ends of the secondary winding of the transformer and including at least a discharge lamp,
wherein power to be supplied to said discharge lamp is reduced when an integrated value of a voltage appearing between the both ends of the primary winding exceeds a predetermined value.

25. A power supply apparatus as set forth in claim 24, wherein said integrated value of the voltage across the primary winding is replaced by an average value of the voltage across the primary winding.

26. A power supply apparatus as set forth in claim 24, wherein said integrated value of the voltage across the primary winding is replaced by a value of the voltage across the primary winding after subjected to a filtering operation by a filter circuit having a cut-off frequency lower than an operational frequency of said switching elements.

27. A power supply apparatus as set forth in claim 24, wherein a drop in an impedance of said discharge lamp is detected to reduce power to be supplied to the discharge lamp.

28. A power supply apparatus as set forth in claim 24, wherein a moment said discharge lamp is lighted is detected to once reduce power to be supplied to said discharge lamp.

29. A power supply apparatus as set forth in claim 15, wherein said rectification circuit for rectifying the output across the secondary winding of the transformer includes a current limiting inductor (L2), a capacitor (Cx) and a smoothing capacitor, a closed circuit being established by said current limiting inductor, capacitor (Cx) and the secondary winding of the transformer to charge the capacitor (Cx) with a unidirectional polarity when an output across the secondary winding has one polarity, an output current through the secondary winding flowing in such a direction so as to discharge charges in the capacitor (Cx) through the inductor (L2) and capacitor (Cx) and into said smoothing capacitor on a load side when said secondary output has the other polarity and a voltage across the capacitor (Cx) is equal to or higher than a predetermined value, said output current of the secondary winding flowing from the inductor (L2) directly into the smoothing capacitor on the load side when the voltage across the capacitor (Cx) is below said predetermined value.

30. A power supply apparatus as set forth in claim 29, wherein a value of said current limiting inductor varies with the polarity of the secondary winding current.

31. A power supply apparatus comprising:

a first series circuit of first and second switching elements that permit reverse-directional current flow and are capable of being alternately turned ON and OFF;

a second series circuit of a D.C. power source and a boosting capacitor connected between both ends of said first series circuit;

a load circuit including an inductance element connected between a junction point of said first series circuit and a junction point of said second series circuit; and control means for controlling said first and second switching elements, wherein said load circuit includes primary and secondary windings of a transformer, a rectifier connected to said secondary winding through a current limiting choke coil, an inverter circuit for converting a D.C. output voltage of said rectifier into a rectangular wave voltage, and a load driven by an output of said inverter circuit, said control means controls the switching elements to cause energy to be stored into said load circuit from a D.C. power source through said first switching element, to cause said energy to be stored in a boosting capacitor through said second switching element, to cause energy in said boosting capacitor to be supplied to the load circuit through the second switching element, to cause a switching frequency of the switching elements to be set to be higher than a resonance frequency of said boosting capacitor and inductance element, and to cause a voltage between both ends of said first series circuit of the first and second switching elements as a voltage across the smoothing capacitor to be higher than a voltage of said D.C. power source.

32. A power supply apparatus as set forth in claim 31, wherein said load is a high pressure discharge lamp.

* * * * *